(12) United States Patent
Okuda et al.

(10) Patent No.: US 7,397,879 B2
(45) Date of Patent: Jul. 8, 2008

(54) DATA COMMUNICATION METHOD AND DATA COMMUNICATION DEVICE AND SEMICONDUCTOR DEVICE

(75) Inventors: Yuichi Okuda, Higashimurayama (JP); Takeshi Sakata, Hino (JP); Takashi Sato, Koganei (JP)

(73) Assignee: Renesas Technology Corp., Tokyo (JP)

( * ) Notice: Subject to any disclaimer, the term of this patent is extended or adjusted under 35 U.S.C. 154(b) by 732 days.

(21) Appl. No.: 10/377,721

(22) Filed: Mar. 4, 2003

(65) Prior Publication Data

US 2003/0161409 A1    Aug. 28, 2003

Related U.S. Application Data

(63) Continuation of application No. 10/270,693, filed on Oct. 16, 2002, now Pat. No. 7,319,730.

(30) Foreign Application Priority Data

Nov. 1, 2001    (JP) .............................. 2001-336373

(51) Int. Cl.
*H04L 7/02*    (2006.01)
(52) U.S. Cl. ...................................... 375/361; 375/360
(58) Field of Classification Search ......... 375/259–260, 375/354–355, 359–361
See application file for complete search history.

(56) References Cited

U.S. PATENT DOCUMENTS 4,811,361 A * 3/1989 Bacou et al. ................. 375/242
5,012,467 A * 4/1991 Crane ......................... 370/445
5,278,902 A    1/1994 Nugent
5,408,501 A    4/1995 Cornaby ..................... 375/260

(Continued)

FOREIGN PATENT DOCUMENTS

JP    5-114924    5/1993

(Continued)

OTHER PUBLICATIONS

Kitayama, Hiroyuki, "IEEE 1394 Architecture (Details on the physical layer, serial bus management, and protocol)", *Interface*, Jul. 1999, pp. 58-67 (with English translation).

(Continued)

*Primary Examiner*—Chieh M. Fan
*Assistant Examiner*—Freshteh N. Aghdam
(74) *Attorney, Agent, or Firm*—Miles & Stockbridge P.C.

(57) ABSTRACT

The present invention provides a data communication method and a data communication device capable of performing high-speed data communication by using a parallel link and higher-speed data communication by reducing a timing skew. A data communication method includes: a step of encoding data of N bits (N being 2 or larger) to transmission data of M bits (M being 3 or larger) on a transmission side; a step of generating a transmission signal in which transition takes place in at least one level of any of the transmission data synchronously with a transmission clock and transmitting the transmission signal to a transmission line on the transmission side; a step of recognizing transition in the signal of M bits received via the transmission line and detecting the reception data of M bits synchronized with the transmission clock on a reception side; and a step of decoding the reception data of M bits to the data of N bits.

2 Claims, 25 Drawing Sheets

U.S. PATENT DOCUMENTS

| | | | |
|---|---|---|---|
| 5,491,713 A * | 2/1996 | Kwok et al. | 375/333 |
| 5,598,442 A | 1/1997 | Gregg et al. | |
| 5,768,546 A * | 6/1998 | Kwon | 710/307 |
| 6,021,011 A | 2/2000 | Behrens et al. | |
| 6,134,285 A * | 10/2000 | Lo | 375/355 |
| 6,222,893 B1 * | 4/2001 | Someya | 375/355 |
| 6,362,757 B1 | 3/2002 | Lee et al. | |
| 6,463,092 B1 | 10/2002 | Kim et al. | |
| 6,763,477 B1 * | 7/2004 | McGee | 713/600 |
| 6,959,058 B2 * | 10/2005 | Yoo et al. | 375/355 |
| 2002/0008682 A1 | 1/2002 | Park | |

FOREIGN PATENT DOCUMENTS

| | | |
|---|---|---|
| JP | 8-508623 | 9/1996 |
| JP | 11-308281 | 11/1999 |

OTHER PUBLICATIONS

JEDEC Standard JESD79, "Double Data Rate (DDR) SDRAM Specification", Jun. 2000, pp. 1-72.

* cited by examiner

FIG. 3

| D(t)[0] | D(t)[1] | D(t)[2] | D(t)[3] | DATA VALID FLAG 128 | T(t)[0] | T(t)[1] | T(t)[2] | T(t)[3] | T(t)[4] | T(t)[5] |
|---|---|---|---|---|---|---|---|---|---|---|
| 0 | 0 | 0 | 0 | 1 | 0 | 0 | 1 | 0 | 1 | 1 |
| 1 | 0 | 0 | 0 | 1 | 0 | 1 | 0 | 0 | 1 | 1 |
| 0 | 1 | 0 | 0 | 1 | 1 | 0 | 0 | 0 | 1 | 1 |
| 1 | 1 | 0 | 0 | 1 | 0 | 0 | 1 | 1 | 0 | 1 |
| 0 | 0 | 1 | 0 | 1 | 0 | 1 | 0 | 1 | 0 | 1 |
| 1 | 0 | 1 | 0 | 1 | 1 | 0 | 0 | 1 | 0 | 1 |
| 0 | 1 | 1 | 0 | 1 | 0 | 0 | 1 | 1 | 1 | 0 |
| 1 | 1 | 1 | 0 | 1 | 0 | 1 | 0 | 1 | 1 | 0 |
| 0 | 0 | 0 | 1 | 1 | 1 | 0 | 0 | 1 | 1 | 0 |
| 1 | 0 | 0 | 1 | 1 | 0 | 1 | 1 | 0 | 0 | 1 |
| 0 | 1 | 0 | 1 | 1 | 0 | 1 | 1 | 0 | 1 | 0 |
| 1 | 1 | 0 | 1 | 1 | 0 | 1 | 1 | 1 | 0 | 0 |
| 0 | 0 | 1 | 1 | 1 | 1 | 0 | 1 | 0 | 0 | 1 |
| 1 | 0 | 1 | 1 | 1 | 1 | 0 | 1 | 0 | 1 | 0 |
| 0 | 1 | 1 | 1 | 1 | 1 | 0 | 1 | 1 | 0 | 0 |
| 1 | 1 | 1 | 1 | 1 | 1 | 1 | 0 | 0 | 0 | 1 |
| NO DATA | | | | 1 | 1 | 1 | 0 | 0 | 1 | 0 |
| COMMAND 0 | | | | 1 | 1 | 1 | 0 | 1 | 0 | 0 |
| COMMAND 1 | | | | 1 | 1 | 1 | 1 | 0 | 0 | 0 |
| COMMAND 2 | | | | 1 | 0 | 0 | 0 | 1 | 1 | 1 |
| (0) | (0) | (0) | (0) | 0 | OTHERS | | | | | |

FIG. 18

| Signal | Values |
|---|---|
| 101_m | L(0)[5:0] X L(1)[5:0] X L(2)[5:0] X L(3)[5:0] X L(4)[5:0] X L(5)[5:0] |
| 1001_m_0 | L(-3)[5:0] X L(1)[5:0] X L(5)[5:0] |
| 1001_m_1 | L(-3)[5:0] X L(1)[5:0] X L(5)[5:0] |
| 1001_m_2 | L(-3)[5:0] X L(1)[5:0] X L(5) |
| 1001_m_3 | L(-2)[5:0] X L(2)[5:0] |
| 1001_m_4 | L(-2)[5:0] X L(2)[5:0] |
| 1001_m_5 | L(-2)[5:0] X L(2)[5:0] |
| 1001_m_6 | L(-1)[5:0] X L(3)[5:0] |
| 1001_m_7 | L(-1)[5:0] X L(3)[5:0] |
| 1001_m_8 | L(-1)[5:0] X L(3)[5:0] |
| 1001_m_9 | L(0)[5:0] X L(4)[5:0] |
| 1001_m_10 | L(-4) X L(0)[5:0] X L(4)[5:0] |
| 1001_m_11 | L(-4)[5:0] X L(0)[5:0] X L(4)[5:0] |
| 1111_2 | (waveform) |
| 1111_8 | (waveform) |
| OUTPUT OF 1301_m_s | L(-3,-2)[5:0] X L(1,2)[5:0] |
| OUTPUT OF 1302_m_s | L(-7,-6,-5,-4)[5:0] X L(-3,-2,-1,0)[5:0] ← tCN+tEO+tFF → |
| 1307 | X X |
| OUTPUT OF 1305_m_t | L(-11,-10,-9,-8)[5:0] X L(-7,-6,-5,-4)[5:0] ← tDE+tEO+tFF → |
| OUTPUT OF 121 | D(-15,-14,-13,-12) X D(-11,-10,-9,-8)[3:0] |
| OUTPUT OF 126_m_t | D(-15,-14,-13,-12) X D(-11,-10,-9,-8)[3:0] |

DATA COMMUNICATION METHOD AND DATA COMMUNICATION DEVICE AND SEMICONDUCTOR DEVICE

CROSS-REFERENCE TO RELATED APPLICATIONS

This application is a continuation of application Ser. No. 10/270,693 filed Oct. 16, 2002, now U.S. Pat. No. 7,319,730.

BACKGROUND OF THE INVENTION

The present invention relates to a data communication device and a technique effectively applied for a technique of data communication performed between, mainly, an MPU (Micro Processing Unit) and a main storage device or the like.

Methods of performing data communication between integrated circuits are roughly divided into a parallel communication method (parallel link) using a plurality of transmission lines and transmitting data in parallel, and a serial communication method (serial link) using a single transmission line and transmitting data in series. Usually, the parallel link can simultaneously transmit plural data, so that a transmission/reception data amount per unit time is large. However, since it is necessary to suppress a skew of timings of the plural data, the parallel link is generally used, for example, in data communication between the semiconductor integrated circuits having a short transmission line. On the other hand, in the serial link, since only a piece of data can be transmitted/received per unit time, the transmission/reception data amount per unit time is small. However, it is unnecessary to consider the timing skew, so that transmission of long distance is easy. The serial link is mainly used for connecting digital devices such as a VCR (video cassette recorder), a DVD player, a mini-disc recorder, a set-top box, and the like.

An example of the parallel link is disclosed in "JEDEC standard 79, Double Data Rate (DDR) SDRAM specification" (hereinbelow, called Literature 1). An example of the serial link is disclosed in "Architecture of IEEE 1394", Interface, July, 1999 (hereinbelow, called Literature 2).

SUMMARY OF THE INVENTION

By the scaling of a metal oxide semiconductor (MOS) transistor, the throughput of an integrated circuit (IC) has been dramatically increased. However, the scaling of the MOS is not easily applied to an interface between an IC and the outside and, accordingly, the data transmission speeds of the IC and the outside is becoming an issue. Particularly, in communication between ICs (integrated circuits) on the same printed circuit board (PC board), the communication speed is insufficient and it is causing deterioration of the performance of the whole system.

In the case where the same data continues in a conventional parallel link, transition of a signal does not occur in a transmission line. Consequently, in order to determine the number of continuous data pieces (run length), a clock signal or data strobe signal is required. The problem of separately transmitting the clock signal and data is constraint of timings. In the conventional parallel link, a clock signal CLK for data reception goes high (or goes low) around the center of a window of data, and data is received in a lump. In Literature 1, at the time of data transmission (reading operation) from a memory to a memory controller, a DQS signal (strobe) and DQ (data) are output with the same phase, and the phase for data reception is generated in the memory controller.

In this case, the data and clock signal CLK have jitter and skew, so that the phases vary. In order to receive data accurately, sufficient set-up time and hold time is necessary for data with respect to the clock signal CLK. The window of data as a timing margin is reduced by the jitter of the clock signal CLK and is further divided into the set-up time and hold time. When the data transfer speed increases, the window of data is narrowed but the variations in the phases of the data and clock signal CLK do not change so much. It disturbs increase in the data transfer speed per transmission line in the parallel link.

An input/output pin of a semiconductor integrated circuit device always includes an inductance component. Usually, a current does not pass to a CMOS buffer in a steady state but is generated only when transition takes place in a transmission line. The parallel link has a plurality of buffers. When transition takes place in output signals of all of the output buffers, a large current flows between a power supply line in the chip and a ground line. The potential difference which appears between both ends of the inductance depends on a change amount of the flowing current and increases. Consequently, when the current largely changes as described above, the potential difference between the power supply line for applying an operation voltage to an output buffer and the ground line largely decreases on assumption that the external power supply line and the ground line are stable. Fluctuations between the power supply line and the ground line are called simultaneous switching noise. When the power supply voltage decreases, the current driving force of the output buffer decreases, and a delay of the output buffer increases.

When transition takes place only in an output signal of one of the plurality of output buffers, a current does not flow so much between the power supply line for applying the operation voltage to the output buffer and the ground line, and a current change amount is small. Consequently, a potential difference appearing between both ends of the inductance depends on the change amount of the flowing current and decreases. In the case where the current change amount is small as described above, the potential difference between the power supply line for applying the operation voltage to the output buffer and the ground line does not decrease so much. Therefore, the current driving force of the output buffer does not decrease so much, and a delay of the output buffer is reduced.

As described above, a difference in delay time of the output buffer occurs between the case where the number of output signals in which transition occurs is large and the case where the number is small. The jitter causes decrease in the timing window, and it disturbs increase in the transmission speed. Although it is easily inferred from analogy, the larger the number of transmission lines is, the larger the jitter in the transmission lines due to the simultaneous switching noise is, and increase in the number of transmission lines can be also prevented.

An object of the invention is to provide a data communication method and a data communication device realizing high-speed data communication while using a parallel link. Another object of the invention is to provide a data communication method and a data communication device capable of performing higher-speed data communication by reducing a timing skew while using a parallel link. The above and other objects and novel features of the invention will become apparent from the description of the invention and the appended drawings.

The outline of representative one of inventions disclosed in the specification will be briefly described as follows. A data communication method includes: a step of encoding data of N bits (N being 2 or larger) to transmission data of M bits (M being 3 or larger) on a transmission side; a step of generating a transmission signal in which transition takes place in at least one level of any of the transmission data synchronously with a transmission clock and transmitting the transmission signal to a transmission line on the transmission side; a step of recognizing transition in the signal of M bits received via the transmission line and detecting the reception data of M bits synchronized with the transmission clock on a reception side; and a step of decoding the reception data of M bits to the data of N bits.

BRIEF DESCRIPTION OF THE DRAWINGS

FIG. 3 is a configuration diagram showing an example of data encoding according to the invention.

FIG. 18 is a timing chart for explaining an example of the operation of the data communication device of FIG. 12.

DETAILED DESCRIPTION OF THE PREFERRED EMBODIMENTS

Figure 1:
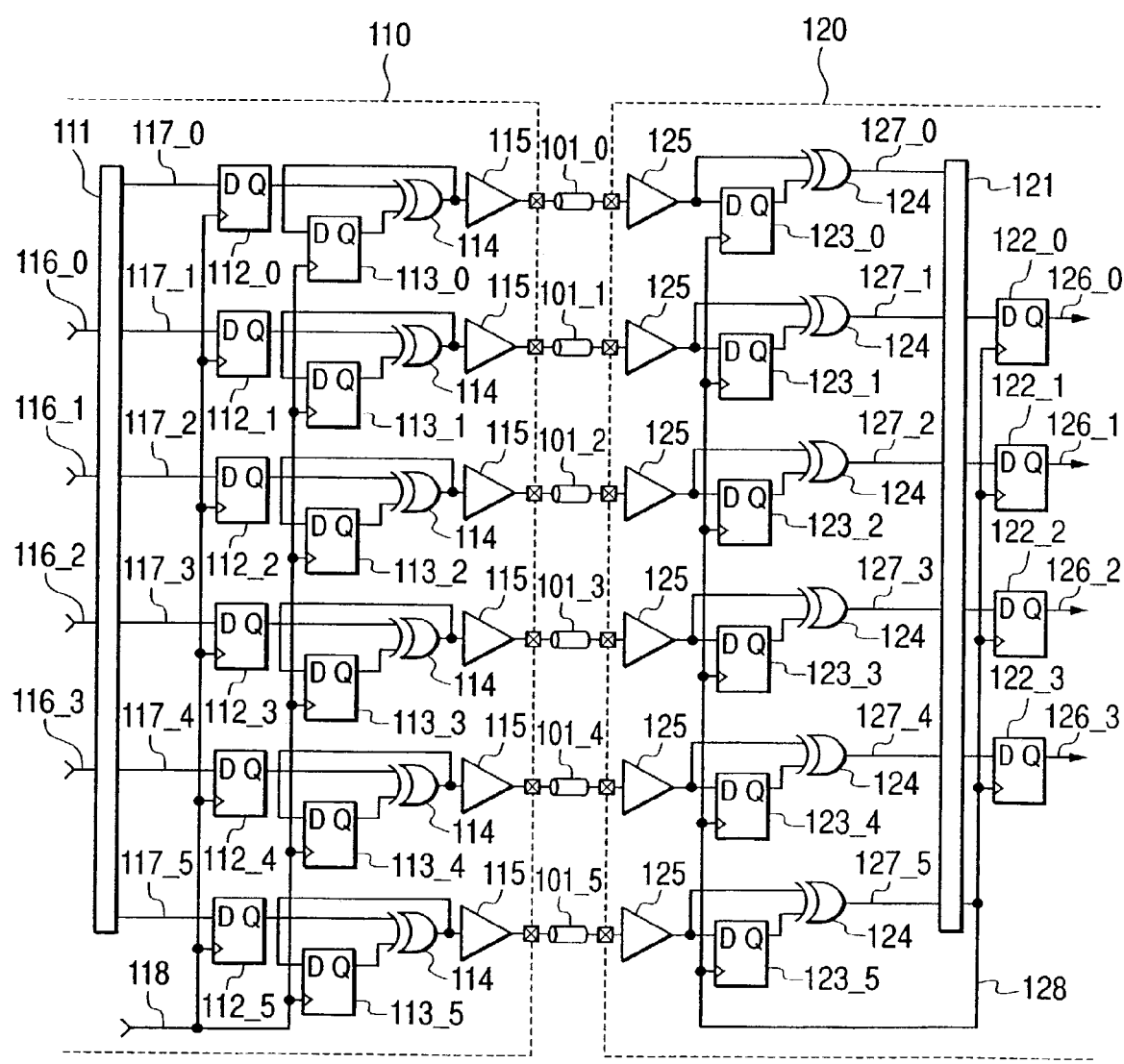
FIG. 1 is a block diagram showing an embodiment of a data communication device according to the invention.

FIG. 1 is a block diagram showing an embodiment of a data communication device according to the invention. The schematic configuration of the data communication device of the embodiment is as follows. Reference numeral 110 denotes a transmission-side device, and reference numeral 120 indicates a reception-side device. Although not limited, each of the transmission-side device 110 and the reception-side device 120 is formed as a semiconductor chip. The two semiconductor chips 110 and 120 are connected to each other via transmission lines 110_0 to 110_5. Although not particularly limited, the transmission lines 110_0 to 110_5 are formed by printed wiring on a mounting board on which the transmission-side device 110 and the reception-side device 120 are mounted.

In the transmission-side device 110, terminals 116_0 to 116_3 (116_n) are data input terminals to which transmission data generated by a not-illustrated data processing circuit included in the transmission-side device 110 is input. Although not limited, the embodiment is directed to an example of transmitting parallel data of four bits corresponding to the terminals 116_0 to 116_3. The 4-bit data is converted to transition codes 117_0 to 117_5 of six bits by an encoder 111. The transition codes 117_0 to 117_5 are transmitted to the transmission lines 101_0 to 101_5 via a transmission circuit.

The transmission circuit converts the logic value of the transition code to a form indicative of the presence or absence of transition in the level of a transmission line by D-type flip-flops 112_0 to 112_5 and 113_0 to 113_5 which operate synchronously with a clock signal 118 for transmission and exclusive OR circuits 114 and transmits the resultant to the transmission lines 101_0 to 101_5 via an output buffer 115. For example, when the logic value of the transition code is "1" (=logic 1), the level of the transmission line is shifted. When the logic value is "0" (=logic 0), the level of the transmission line is not shifted but is maintained. To make such transition take place in the level of a transmission line, an exclusive OR circuit is used.

The transition code is output from each of the D-type flip-flops 112_0 to 112_5, and each of the flip-flops 113_0 to 113_5 maintains the immediately preceding level of the transmission line which is generated by the exclusive OR circuit 114. When the transition code output from the flip-flops 112_0 to 112_5 has logic 1, the exclusive OR circuit 114 shifts (inverts) the level of the immediately preceding transmission line held in the flip-flops 113_0 to 113_5. When the transition code has logic 0, the exclusive OR circuit 114 outputs the level of the transmission line which is the same as that held in the flip-flops 113_0 to 113_5.

In the reception-side device 120, the level of the transmission line transmitted via each of the transmission lines 101_0 to 101_5 is received by an input buffer 125, and a reception signal of the form indicative of the presence or absence of transition in the level of the transmission line is converted into each of binary transition codes 127_0 to 127_5 by a reception circuit constructed by flip-flops 123_0 to 123_5 and exclusive OR circuits 124. The transition codes 127_0 to 127_5 are decoded to the original 4-bit data by a decoder 121, the original 4-bit data is received by flip-flops 122_0 to 122_3, and 4-bit reception data 126_0 to 126_3 is generated. The reception data is transmitted to a not-shown signal processing circuit.

In the embodiment, when transmission data of the transmission-side device 110 consists of N bits, the encoder 111 encodes the N-bit transmission data into a transition code of M bits. In this case, setting is made so as to satisfy the relation of M>N, and the transition code obtained by the encoding includes logic 1 of at least one bit.

Figure 2:
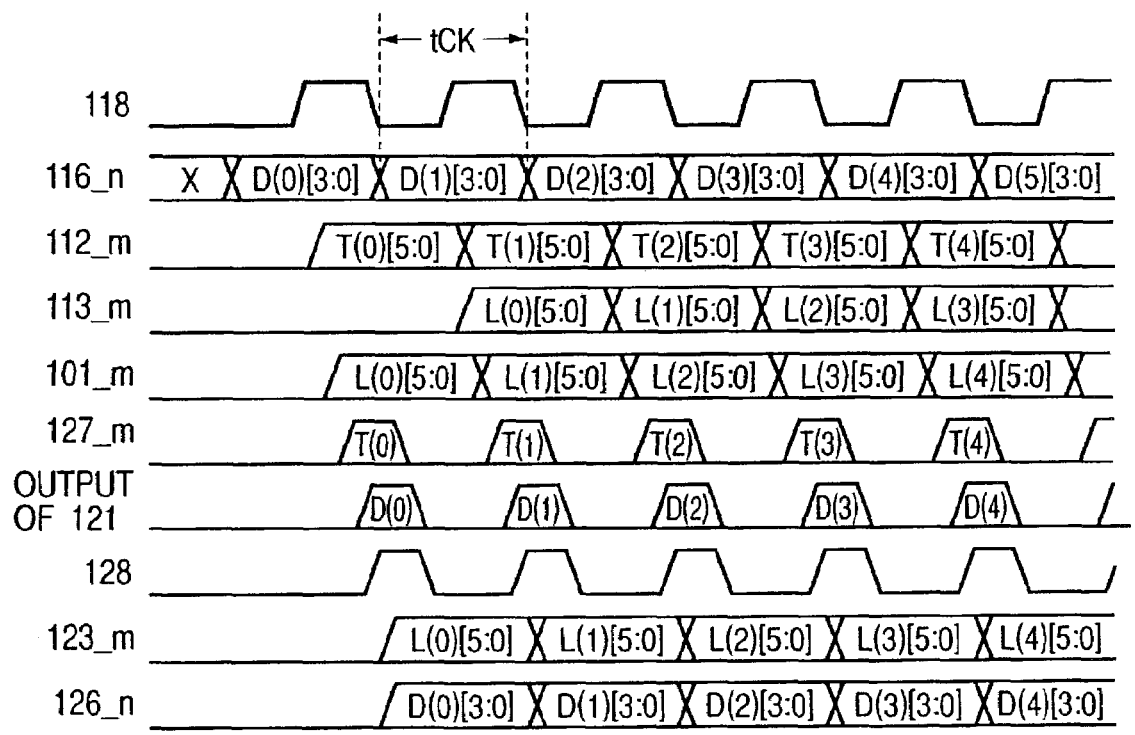
FIG. 2 is an operation waveform chart for explaining an example of the operation of the circuit of FIG. 1.

FIG. 2 is an operation waveform chart for explaining an example of the operation of the circuit of the example shown in FIG. 1. Description will be given on assumption that outputs of all of the D-type flip-flops (D-FF) in FIG. 1 are "0" in the initial state. In an actual system, in transmission/reception circuits, at the time of initialization of the circuit and immediately after (or just before) data communication, each of the D-FFs is reset. Therefore, just before start of data communication, all of the D-FFs are reset. The timing of finishing the data communication may be instructed by a command, determined by predetermining an amount of data per communication command, or the like. The invention is not limited to the methods.

As shown in FIG. 2, a cycle of data transfer is defined as tCK. The operation of the transmission-side device 110 is as follows. Transmission data D(t)[3:0] generated by a not-shown signal processing circuit is input to the data input terminals 116_0 to 116_3. D(t)[0], D(t)[1], D(t)[2], and D(t)[3] are input to the input terminals 116_0, 116_1, 116_2, and 116_3, respectively. Hereinafter, in the specification, an expression such as "D(t)[n] is input to 116_n" will be used. D(t)[3:0] denotes data of time t and a bit width of four bits. The value of D(t)[3:0] becomes a discrete value by the transmission clock 118, and data after one cycle of the transmission clock 118 is expressed as D(t+1)[3:0]. The other data will be similarly described by the data expressing method.

The data D(t)[3:0] is encoded by the encoder 111 and is output as a transition code T(t)[5:0] to the transmission line 117_m. The conversion can be expressed by the following equation (1).

$$f(D(t)[3:0])=T(t)[5:0] \quad (1)$$

FIG. 3 is a configuration diagram showing an example of data encoding. The diagram shows an example of conversion by the encoding from D(t)[3:0] to T(t)[5:0]. As understood from FIG. 3, d(t)[3:0] and T(t)[5:0] correspond to each other in a one-to-one manner and can be converted mutually. The encoder 111 in FIG. 1 can be realized by using a read only memory (ROM). It can be also realized by combining logic gate circuits as will be described hereinbelow.

Figure 4:
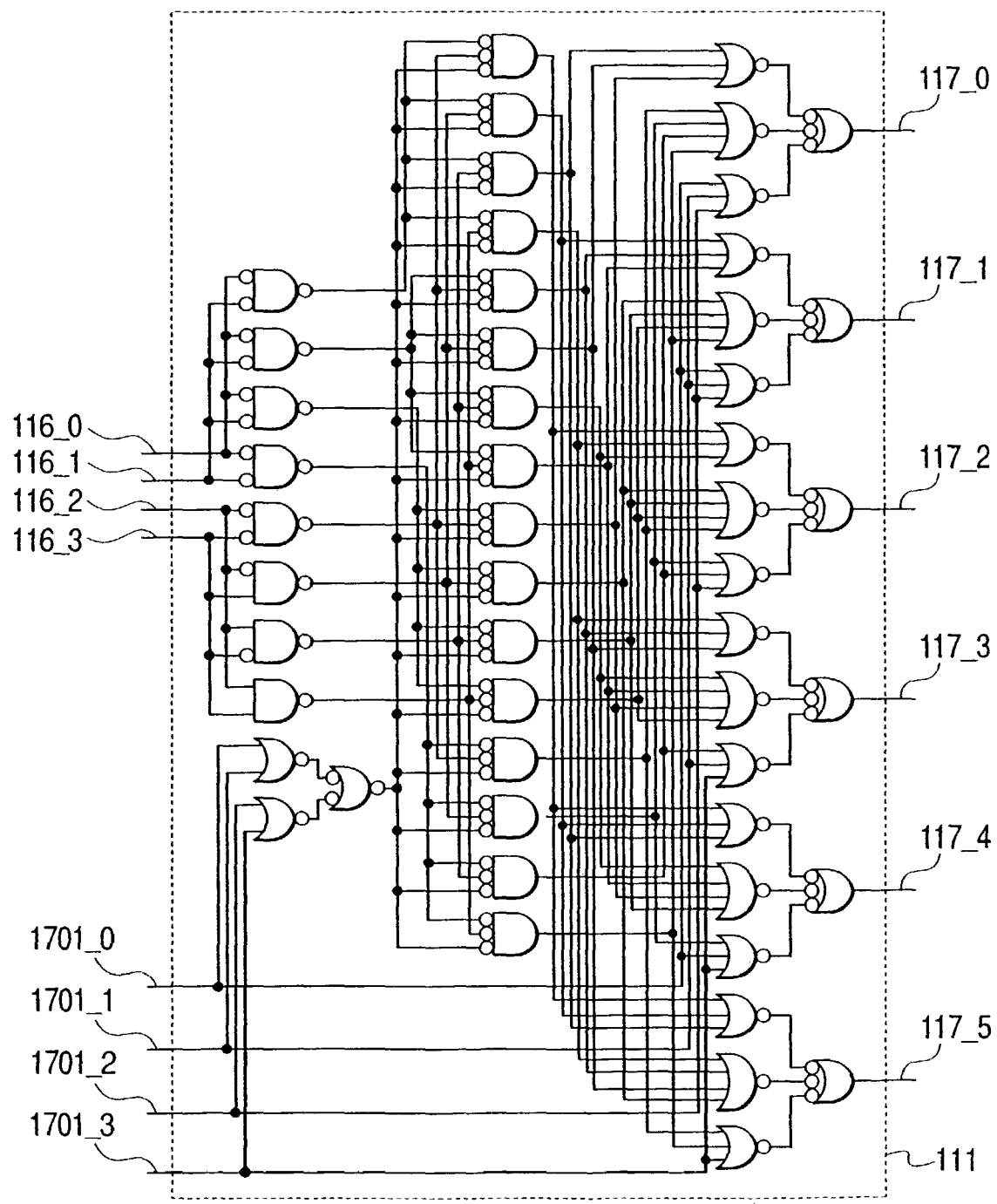
FIG. 4 is a circuit diagram showing an example of an encoder used for the invention.

FIG. 4 is a circuit diagram showing an example of an encoder used for the invention. In the embodiment, parallel data of four bits supplied from the input terminals 116_0 to 116_3 is divided into two sets each having two bits and converted into four decode signals by a 2-input NAND gate circuit. By combining the total eight decode signals in groups of two signals, the decode signals are converted into 16 decode signals. On the basis of the signals, the transition codes 117_0 to 117_5 in which three bits out of six bits shown in FIG. 3 have logic 1 are generated by a gate circuit.

Although not shown in FIG. 1, signals 1701_0 to 1701_3 in the diagram correspond to "No Data", "Command0", "Command1", and "Command2" in FIG. 3, respectively. When the four control signals 1701_0 to 1701_3 are input, the logic gates provided in paths for encoding data received from the input terminals 116_0 to 116_3 are closed, the encoding is made invalid, and a transition code encoded in correspondence with each of the control signals 1701_0 to 1701_3, respectively, is output. The meaning of the control signals will be described hereinlater.

"(0)" in the column of D(t)[n] in the lowest line in FIG. 3 denotes that when T(t)[5:0]="others" is converted, D(t)[3:0] =0 is output and "0" is also set in a data valid flag 128, and it does not have any meaning at the time of conversion from D(t)[3:0] to T(t)[5:0]. As shown in FIG. 3, T(t)[5:0] is encoded so that three bits out of six bits are set to "1" and the other three bits are set to "0". The value in the case of T(t)[5:0] under this condition can be expressed as Expression 2.

$$_6C_3=20 \quad (2)$$

Since D(t)[3:0] is a 4-bit signal, the number of signals in this case is 16. Therefore, all of D(t)[3:0] can be expressed by the transition code T(t)[5:0] of six bits. T(t)[m] is latched by the flip-flop 112_m at the rising edge of the transmission clock 118. At this time, in the flip-flop 113_m, the level L(t−1)[m] of the transmission line of the immediately preceding cycle is held. All of L(t−1)[m] in the initial state is "0". T(t)[m] and L(t−1)[m] are computed by the exclusive OR circuit (ExOR) 114 and the resultant is transmitted by the output buffer 115. The level of the transmission line is expressed as L(t)[m] as shown by Expression (3).

$$L(t)[m]=T(t)[m]*L(t-1)[m] \quad (3)$$

where * denotes exclusive OR computation (also hereinbelow).

In the next cycle of the transmission clock 118, D(t+1)[n] is input to the input terminal 116_n, L(t)[m] is held in the flip-flop 113_m, and the level of the transmission line 101_m becomes L(t+1)[m].

The operation of the reception-side device 120 is as follows. In the flip-flop 123_m, the level L(t−1)[m] of the transmission line of the immediately preceding cycle is held. In this case as well, all of L(t−1)[m] in the initial state is "0". The level L(t−1)[m] and the level L(t)[m] of the transmission line 101_m amplified by the input buffer 125 are subjected to exclusive OR computation by the exclusive OR circuit 124, thereby outputting a transmission code T(t)[m] expressed by Expression (4) to the line 127_m.

$$T(t)[m]=L(t)[m]*L(t-1)[m] \quad (9)$$

By the nature of exclusive OR computation, when Expression (3) is satisfied, Expression (4) is unconditionally satisfied. The reconstructed transition code T(t)[5:0] is decoded by the decoder 121, and D(t)[3:0] is output. The decoder 121 outputs a flag indicating that the decoded data is valid as the data valid flag 128. The decoder 121 is designed so as to output the data valid flag 128 slightly after D(t)[m]. The data valid flag 128 is set a little after D(t)[m], thereby enabling data set-up time in the D-type flip-flop 122_n to be assured.

In the case where T(t)[5:0] is still invalid due to a skew in a transmission line or the like, that is, in the case where "others" in FIG. 3 is input, "0" is set in all of the data valid flag 128 in the decoder 121 and D(t)[n]. The D-type flip-flop 122_n latches D(t)[n] at the rising edge of the data valid flag 128 and outputs D(t)[n] from the data output terminal 126_n. This completes the data transmission of the transmission/reception-side devices. Since 101_m and 123_m have the same value immediately after the data valid flag 128 is set, all of the output 127_m of the exclusive OR circuit 124 and the decoder 121 become "0". The decoder 121 can be constructed by using a ROM in a manner similar to the encoder 111 or can be also constructed by a circuit using the following logic gate circuit.

Figure 5:
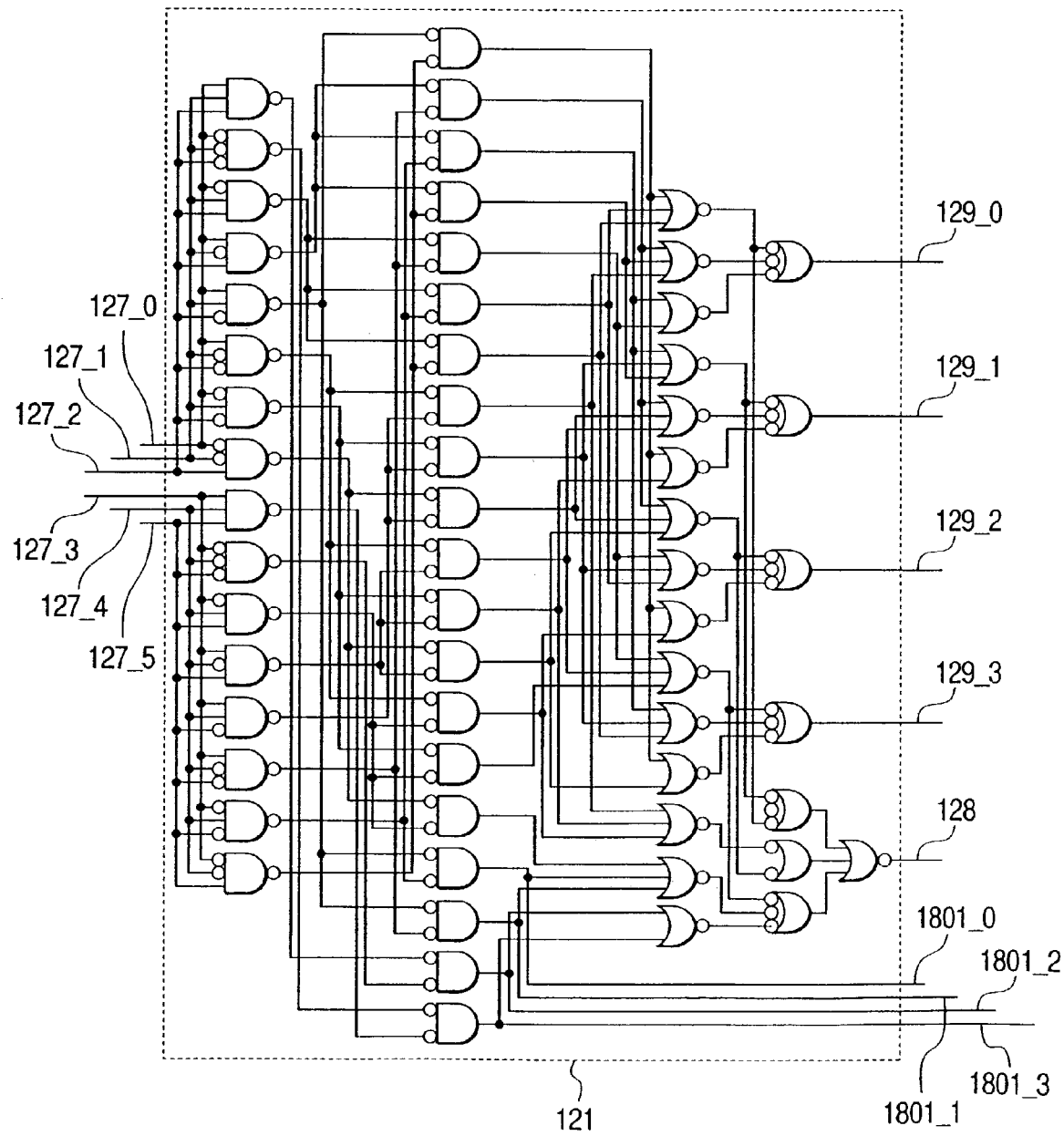
FIG. 5 is a circuit diagram showing an example of a decoder used for the invention.

FIG. 5 is a circuit diagram showing an example of the decoder used for the invention. In the decoder 121 of the embodiment, a transition code of six bits supplied from the input terminals 127_0 to 127_5 is divided into two groups each consisting of three bits which are converted into eight decode signals by the NAND gate circuit. By combining total 16 decode signals by two, total 20 decode signals are generated. On the basis of the decode signals, 4-bit data 129_0 to 129_3 in 16 ways shown in FIG. 3 and signals 1801_1 to 1801_3 in four ways are generated by the gate circuits.

The signals 1801_0 to 1801_3 are not shown in FIG. 1 and correspond to the signals 1701_0 to 1701_3 in the encoder 111. Specifically, the signals 1801_0 to 1801_3 correspond to "No Data", "Command0", "Command1", and "Command2" in FIG. 3, respectively.

Figure 6A:
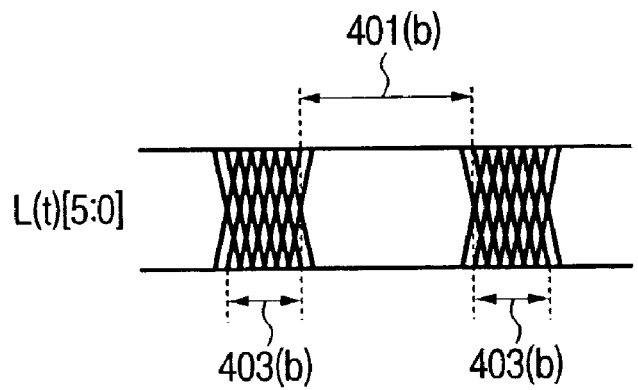
FIGS. 6A to 6C are waveform diagrams for explaining the invention.
Figure 6B:
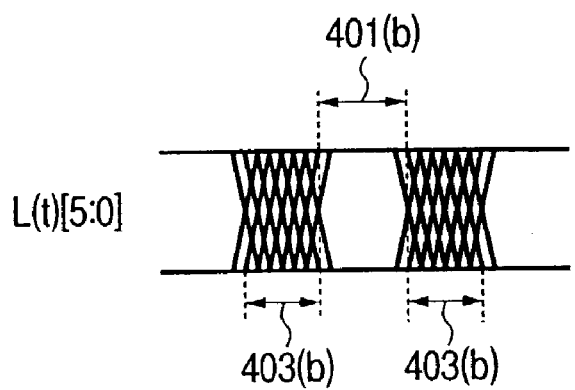
Figure 6C:
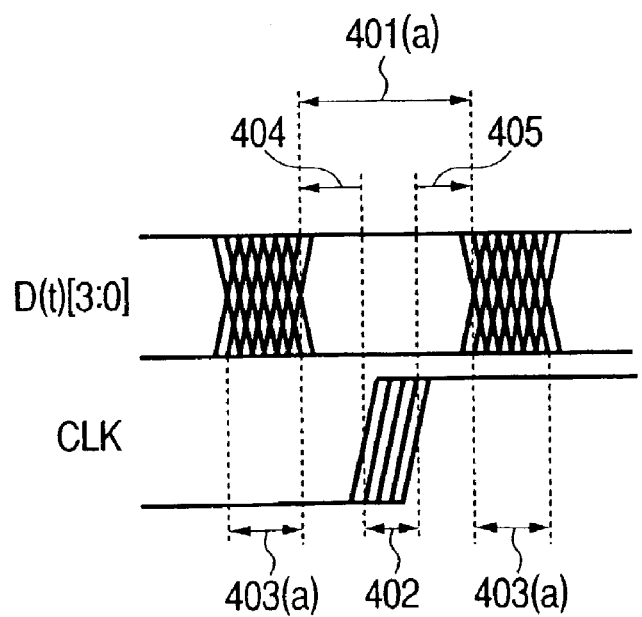

FIGS. 6A to 6C are waveform diagrams for explaining the invention. FIGS. 6A and 6B are examples of waveforms for explaining the invention. FIG. 6C shows an example of the waveform in a conventional parallel link for comparison. In the case where the same data is continued in the parallel link as described in Literature 1 (D(t)[3:0]=D(t−1)[3:0]), no transition occurs in a transmission line. Consequently, in order to determine the number of data continued (run length), the clock signal or data strobe signal is necessary. A DQS signal in Literature 1 corresponds to the strobe signal.

As shown in FIG. 6C, in the conventional parallel link, the clock signal CLK for data reception goes high (or low) around the center of a window 401(a) of the data D(t)[3:0] to receive the data D(t)[3:0] in a lump. In Literature 1, in data transfer from a memory to a memory controller (reading operation), a DQS signal (strobe signal) and DQ (data) are output with the same phase. However, since the phase for data reception is generated in the memory controller, it is substantially the same as FIG. 6C.

As shown in FIG. 6C, the data D(t)[3:0] and the clock signal CLK have a jitter and a skew, so that phase varies (402 and 403(a)). In order to accurately receive the data D(t)[3:0], the data D(t)[n] needs sufficient set-up time 404 and hold time 405 with respect to the clock signal CLK. In FIG. 6C, the window 401(a) of the data D(t)[3:0] as a timing margin is decreased by the jitter 402 of the clock signal CLK and is divided into the set-up time 404 and hold time 405. When the data transfer speed increases, the window 401(a) of the data D(t)[3:0] is narrowed whereas the variations 402 and 403(a) of the phase of the data D(t)[3:0] and the clock signal CLK do not change so much. This disturbs increase in the data transfer speed per transmission line in the parallel link.

In contrast, in the transmission/reception-side devices in the invention, the level L(t)[m] itself on the transmission line 101_m does not carry information, data is encoded in transition of the level L(t)[m] and, further, three transmission line transitions always occur per piece of data. It is therefore unnecessary to transmit the clock signal or data strobe signal separately from L(t)[m].

That is, as shown in FIGS. 6A and 6B, in the transmission/reception-side devices in the invention, it is unnecessary to transmit the clock signal CLK. Since the clock for data reception is directly extracted from the level L(t)[5:0] of the transmission line 101_m as the data valid flag 128, the issue of the set-up and hold time of data can be also avoided. Therefore, the timing constraint is only the window 401(b) in the level L(t)[5:0] in the transmission line 101_m. As compared with the conventional parallel link shown in FIG. 6C, if the transmission speed is the same as in FIG. 6A, the timing margin can be increased. If the timing margin is the same as shown in FIG. 6B, the data transfer speed per transmission line can be easily increased.

In addition, as shown in FIG. 3, in T (t)[5:0], three bits are always set to "1" and the other three bits are always set to "0", so that transition always takes place in three transmission lines per data. Therefore, by making the influence of the simultaneous switching noise which often becomes an issue in multibit transfer constant, a jitter caused by the simultaneous switching noise can be substantially suppressed.

Figure 7:
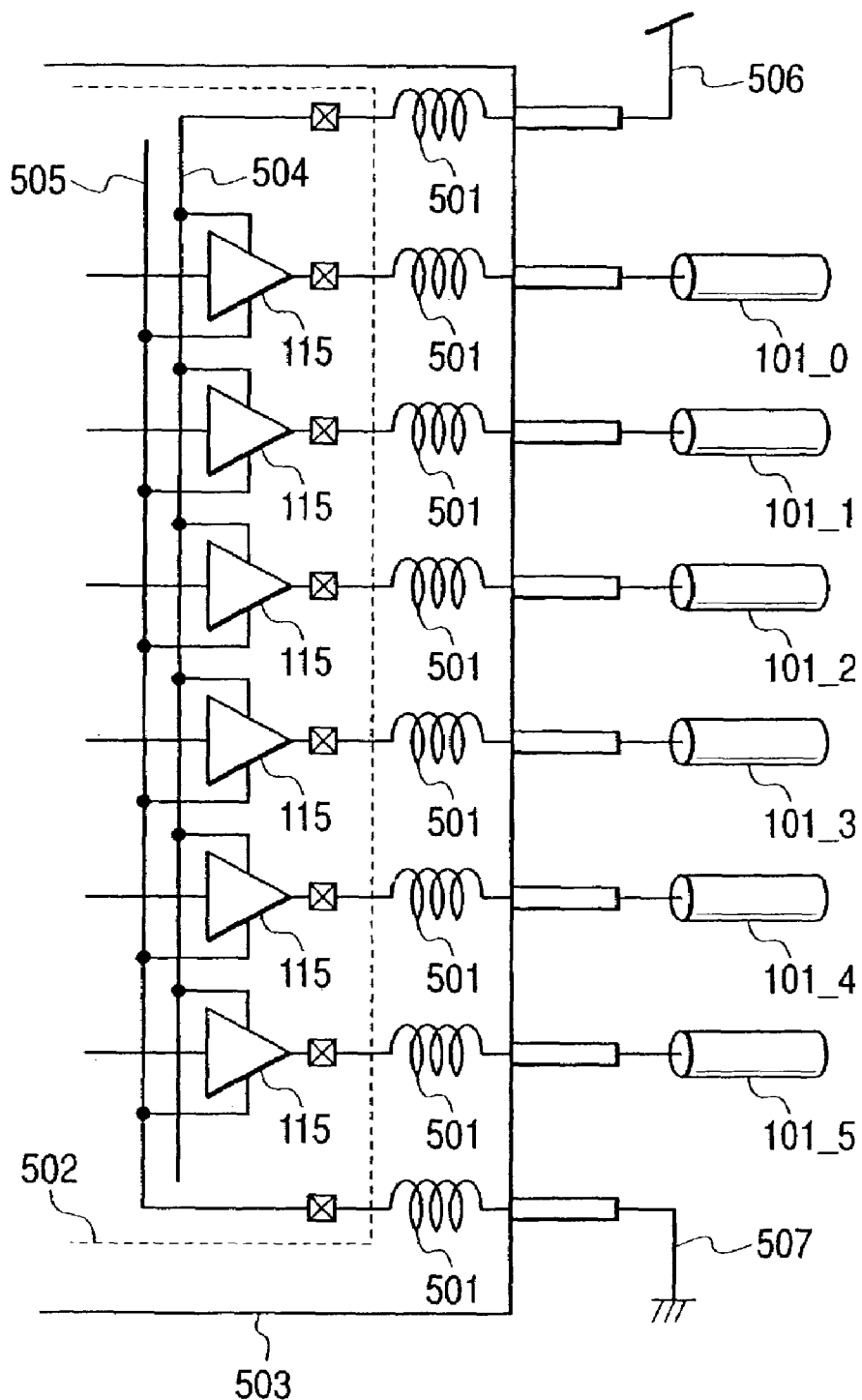
FIG. 7 is a schematic diagram of an equivalent circuit showing an example of transmission buffers and a package used for the invention.

FIG. 7 is a schematic diagram of an equivalent circuit as an example of transmission buffers and a package used for the invention. As shown in FIG. 7, each of input/output pins of a package 503 of a semiconductor integrated circuit as a component of the transmission-side device always includes an inductance component 501. Usually, in a CMOS buffer, in a steady state, no current passes. Only when transition takes place in a transmission line, a current is generated. The potential difference which appears between both ends of the inductance is expressed by the following expression.

$$\Delta V = L(di/dt) \tag{5}$$

In the transmission-side device 110 in the invention, data is encoded so that transition always takes place in the signal levels of three transmission lines out of the six transmission lines 101_0 to 101_5 irrespective of a data pattern of a transmission signal. Consequently, as shown in the waveform chart of FIG. 8, the current waveforms at the time of signal transitions 631 and 641 are always almost constant. Drops in a power supply voltage VCC also become constant, and the potential difference between an operation voltage 504 of the output buffer 115 at such a timing and a ground potential 505 of the circuit also becomes constant. That is, a delay of the output buffer 115 becomes constant irrespective of the data pattern of a transmission signal (d(3)).

Therefore, in the transmission-side device 110 in the invention, although there is an influence of the simultaneous switching noise, the effect becomes constant irrespective of the pattern of transmission data, so that a jitter which depends on the data pattern does not occur. Thus, the timing margin can be further increased or the higher speed can be achieved.

In contrast, in the conventional parallel link, in order to suppress a jitter caused by the simultaneous switching noise, the simultaneous switching noise itself has to be suppressed. The idea is such that, for example, in a parallel link of four bits, by decreasing the absolute value of the noise d(4) at the time of 4-bit transition, the value of the difference d(4)−d(1) between the noise d(4) and the noise d(1) at the time of 1-bit transition is suppressed. As a concrete method, a method of decreasing an effective value of the inductance 501 by employing a low-inductance package and a number of power supply pads has been employed. However, both of the methods cause increase in cost. Particularly, in recent years, because of increased current consumption of an IC and increased speed of data input/output, the number of power supply pads and signal pads is a factor which exerts a large influence on the chip area of an IC.

In the transmission-side device in the invention, the jitter caused by the simultaneous switching noise can be suppressed without increasing the number of power supply pads. Consequently, while increasing the processing speed and the timing margin, although the number of signal pads increases a little as compared with the conventional parallel link, by reducing the number of power supply pads, an excellent effect such that the cost can be also reduced is produced.

The number of information pieces which can be transferred between the transmission-side device 110 and the reception-side device 120 in the invention is 20. That is, the number of combinations of 6-bit information in which three bits have logic 1 and the other three bits have logic 0 is 20. Since the number in the case of the 4-bit data is 16, four pattern which are not encoded exist. The remaining four pattern can carry proper information. For example, as shown in FIG. 3, "No Data" and various commands (Command0, Command1, and Command2) can be encoded.

In Literature 1, a data mask signal using a control signal different from the transmission data DQ and a burst transfer stop command are defined, and it causes increase in the number of signal pads and complicates the circuit. By encoding the data indicative of absence of valid data, these become unnecessary, and the cost can be reduced. By multiplex a command on a data transmission line, a signal pad for command can be also reduced.

By applying the invention, the data speed in a transmission line formed in a printed board largely increases. In contrast with the conventional parallel link, there is the possibility that the signal processing speed of the encoder 111 in the transmission-side device 110 decreases. In this case, a problem such that the data transfer speed is determined by the speed in the encoder 111 arises. Specifically, when time of a period since the transmission data D(t)[n] is input to the terminal 116_n until the transition code T(t)[m] is output to the encoding terminal 117_m is set as tEN, the cycle tCK of the transition in the level L(t)[m] in the transmission lines 101_0 to 101_5 cannot be set equal to or less than tEN.

Figure 9:
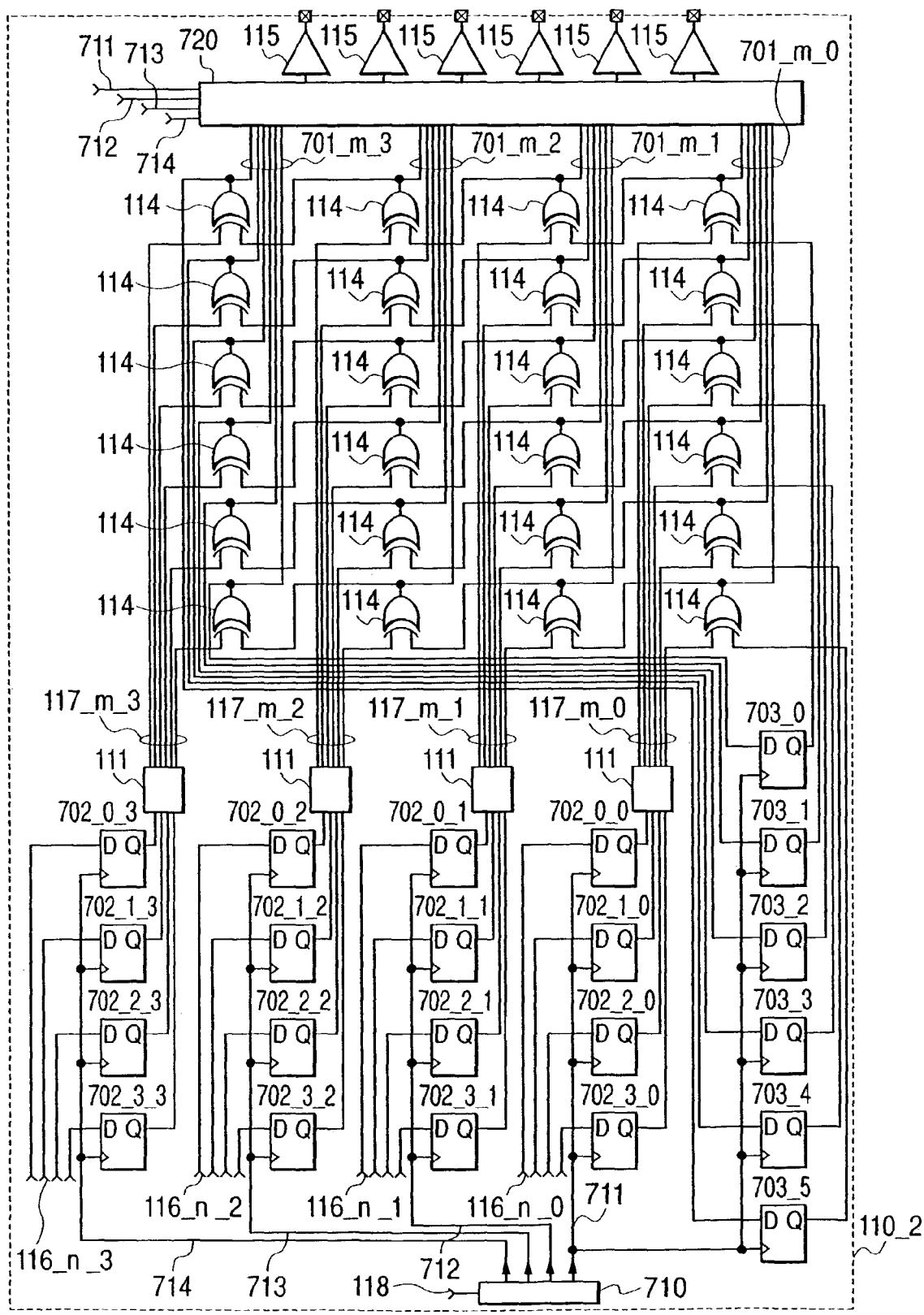
FIG. 9 is a block diagram showing another example of the data communication device according to the invention.
Figure 10:
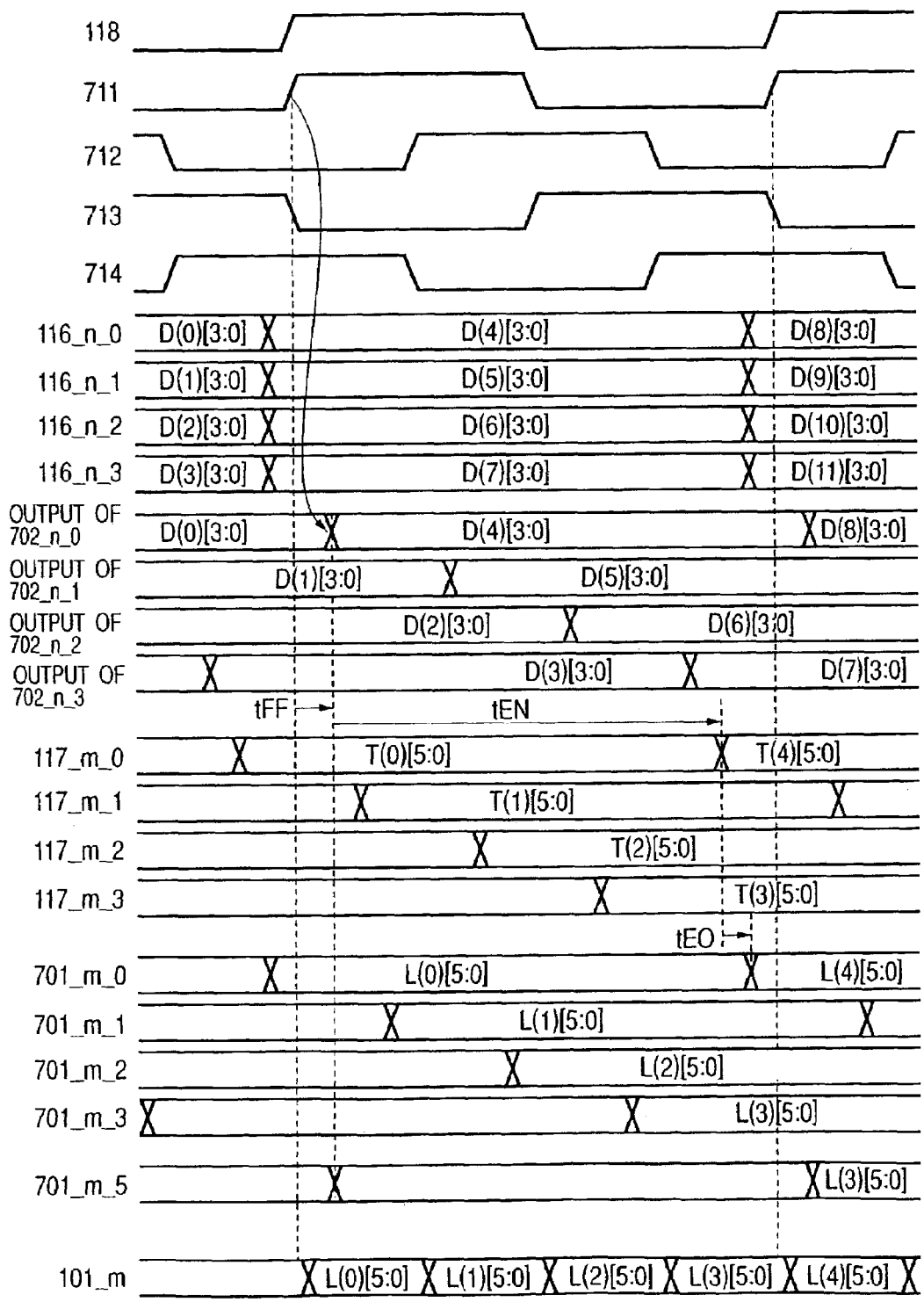
FIG. 10 is a timing chart for explaining the example of FIG. 9.

FIG. 9 is a block diagram showing another embodiment of the data communication device according to the invention. The embodiment is directed to the high-speed transmission-side device 110_2 which realizes high-speed data communication adapted to the data speed in a transmission line. FIG. 10 is a timing chart for explaining an example of the operation.

As shown in FIG. 9, different from the transmission-side device 110 of FIG. 1, the high-speed transmission-side device 110_2 has a phase-locked loop (PLL) circuit 710 for transmission. The PLL circuit 710 for transmission generates clock signals 711, 712, 713, and 714 which have phase differences on a 90-degrees basis from the input transmission clock 118.

Since the high-speed transmission-side device 110_2 handles, although not limited, 16-bit data per cycle, it has four sets of data input terminals 116_n_0, 116_n_1, 116_n_2, and 116_n_3. When 16-bit input data D(4r)[n], D(4r+1)[n], D(4r+2)[n], and D(4r+3)[n] are input to the data input terminals 116_n_0, 116_n_1, 116_n_2, and 116_n_3, respectively, the data is latched by D-type flip-flops 702_n_0, 702_n_1, 702_n_2, and 702_n_3 synchronously with the rising edges of clock signals 711, 712, 713, and 714, respectively.

The input data D(4r)[n], D(4r+1)[n], D(4r+2)[n], and D(4r+3)[n] express the number of cycles starting from zero. In the example, the input data expresses four bits of [3:0]. Therefore, in FIG. 10, 16-bit data of D(0)[3:0], D(1)[3:0], D(2)[3:0], and D(3)[3:0] is output in the preceding cycle, and 16-bit data consisting of D(4)[3:0], D(5)[3:0], D(6)[3:0], and D(7)[3:0] is transmitted in the cycle.

The four pieces of data is encoded in parallel by separate encoders 111. Encoded transition codes T(4r)[m], T(4r+1)[m], T(4r+2)[m], and T(4r+3)[m] are output to the signal lines 117_m_0, 117_m_1, 117_m_2, and 117_m_3, respectively. "r" denotes the number of cycles, and "m" indicates six bits of [5:0].

The transition code T(4r)[m] is subjected to exclusive OR computation with the level L(4r−1)[m] of the transmission line of the preceding cycle held in the D-type flip flop 703_m and the resultant is output as L(4r)[m] to the signal line 701_m_0. Similarly, the transition code T(4r+1) and the immediately preceding output L(4r)[m] are subjected to exclusive OR computation, and the result is output as L(4r+1)[m] to the signal line 701_m_1. In such a manner, L(4r+2)[m] and L(4r+3)[m] are obtained by computation and output to the signal lines 701_m_2 and 701_m_3, respectively.

The level L(4r+3)[m] output to the signal line 701_m_3 is latched by the D-type flip flop 703_m so that it is used in the next cycle. The levels L(4r)[m], L(4r+1)[m], L(4r+2)[m], and L(4r+3)[m] output to the signal lines 701_m_t are converted from a signal having a width of 24 bits to a signal having a width of 6 bits by a parallel-to-serial converter 720. The bit rate at that time increases by four times.

Figure 11:
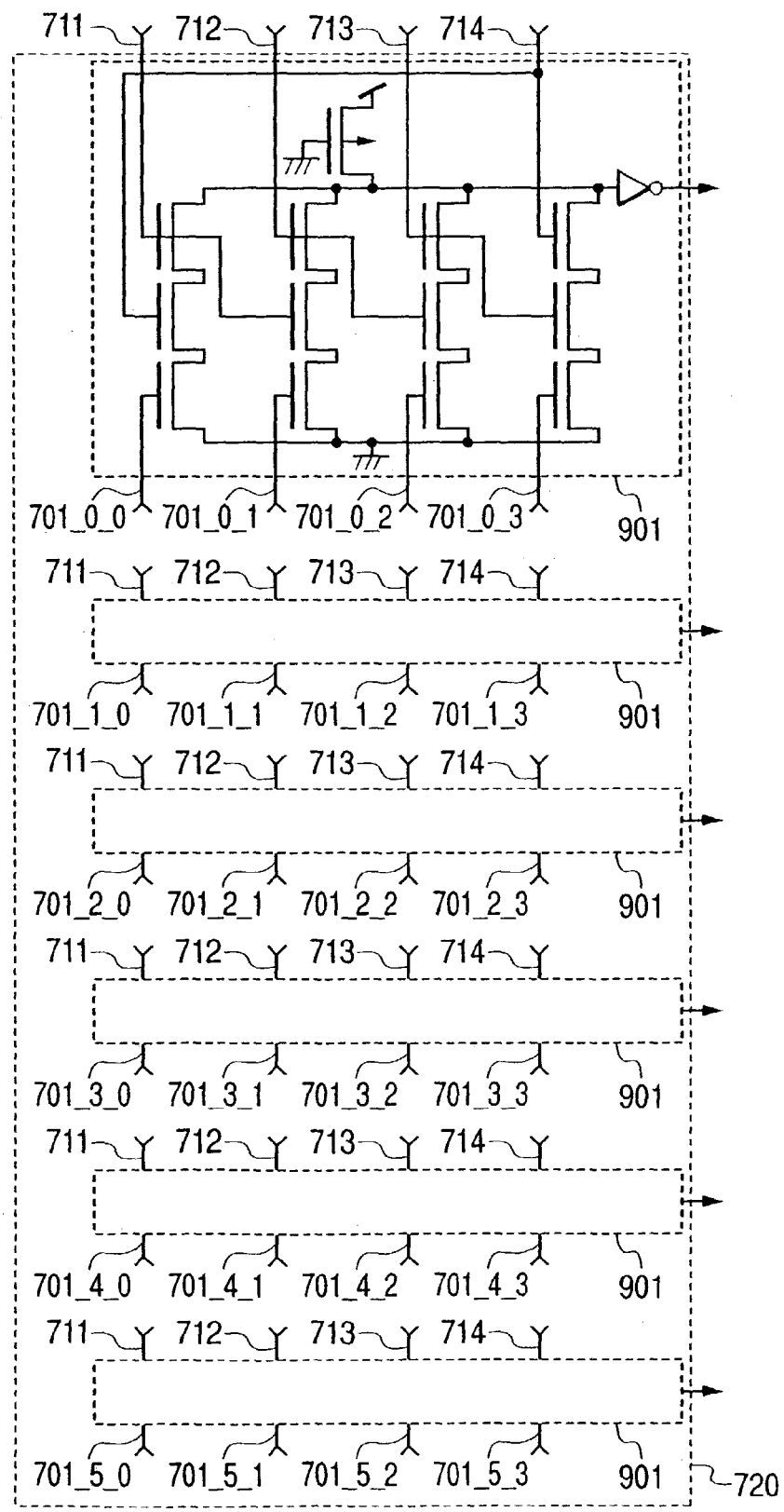
FIG. 11 is a circuit diagram showing an example of a parallel-to-serial converter in FIG. 9.

FIG. 11 is a circuit diagram showing an example of the parallel-to-serial converter of FIG. 9. The parallel-to-serial converter of the embodiment has a structure obtained by combining six serializers 901 each for converting a 4-bit parallel signal to a 1-bit serial signal, and can convert a 24-bit parallel signal to six 1-bit serial signals. The serializer 901 time-divides a cycle of the transmission clock 118 into four in correspondence with the clock signals 711, 712, 713, and 714 generated by the PLL circuit 710 for transmission and serially outputs parallel data in order of 701_0_0, 701_0_1, 701_0_2, and 701_0_3.

In the timing chart of FIG. 10, the cycle of the transmission clock 118 is determined by delay tFF of the D-type flip-flop, delay tEN of the encoder 111, and delay tEO of the exclusive OR circuit 114. When the delay amounts tFF and tEO can be ignored as compared with the delay amount tEN, the cycle of the transmission clock 118 can be reduced to almost the same degree by the transmission-side device 110 and the high-speed transmission-side device 110_2. Since the high-speed transmission-side device 110_2 can transfer data in a cycle of ¼ of the transmission clock 118, the high-speed transmission-side device 110_2 has high transfer speed which is four times as fast as that of the transmission-side device 110. It also means that high data transfer speed which is almost ¼ of the delay time tEN in the encoder 111 can be realized.

In the example of FIG. 9, four pieces of data are processed in parallel. Obviously, the number of pieces of data can be increased. For example, when eight pieces of data are processed in parallel, transfer speed which is eight times as high as that of the transmission clock 118 can be obtained. By increasing the degree of parallelism, required data transfer speed can be obtained irrespective of the speed of a MOS transistor.

In a critical path in the reception-side device 120 shown in FIG. 1,
i) the level of the transmission line 101_m changes,
ii) decoding is performed by the decoder 121,
iii) the data valid flag 128 is set,
iv) the level of the transmission line 101_m is latched by the D-type flip-flop 123_m,
v) decoding is performed by the decoder 121, and
vi) the data valid flag 128 is cleared.

When the delay amounts in the D-type flip-flop 123_m and the exclusive OR circuit 124 are small enough to be ignored, time twice as long as the decode time tDE of the decoder 121 becomes the minimum value of a transfer data cycle tCK. When the process time tEN of the encoder 111 and the process time tDE of the decoder 121 are the same, the upper limit of the data reception speed in the reception-side device 120 is the half of the upper-limit transmission speed of the transmission-side device 110. Obviously, the reception speed is only ⅛ of that of the high-speed transmission device 110_2. To increase the transfer rate, apparently, the processing speed of a reception circuit has to be increased.

Figure 12:
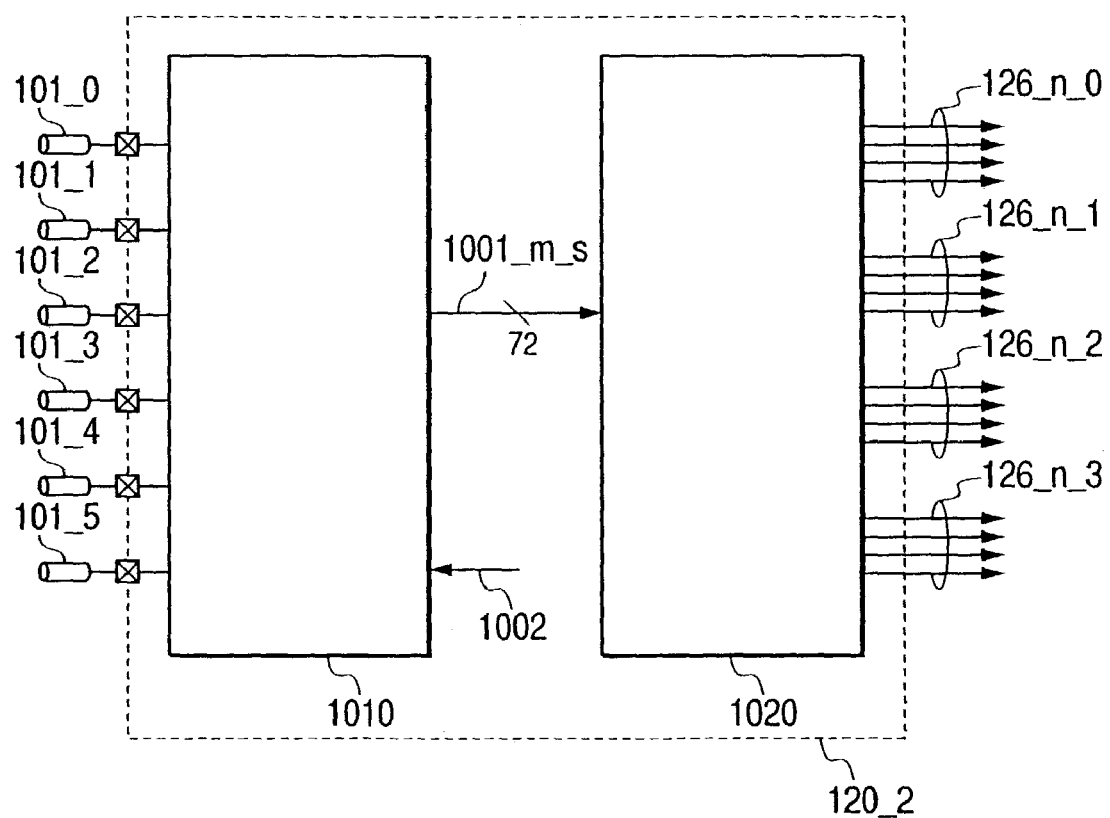
FIG. 12 is a block diagram showing another example of the data communication device according to the invention.

FIG. 12 is a block diagram showing another example of the data communication device according to the invention. The embodiment is directed to a high-speed reception-side device 120_2 capable of performing high-speed data communication adapted to the data speed in a transmission line. The high-speed reception-side device 120_2 of the embodiment is divided into a data sampling circuit 1010 and a data decoding circuit 1020.

Figure 13:
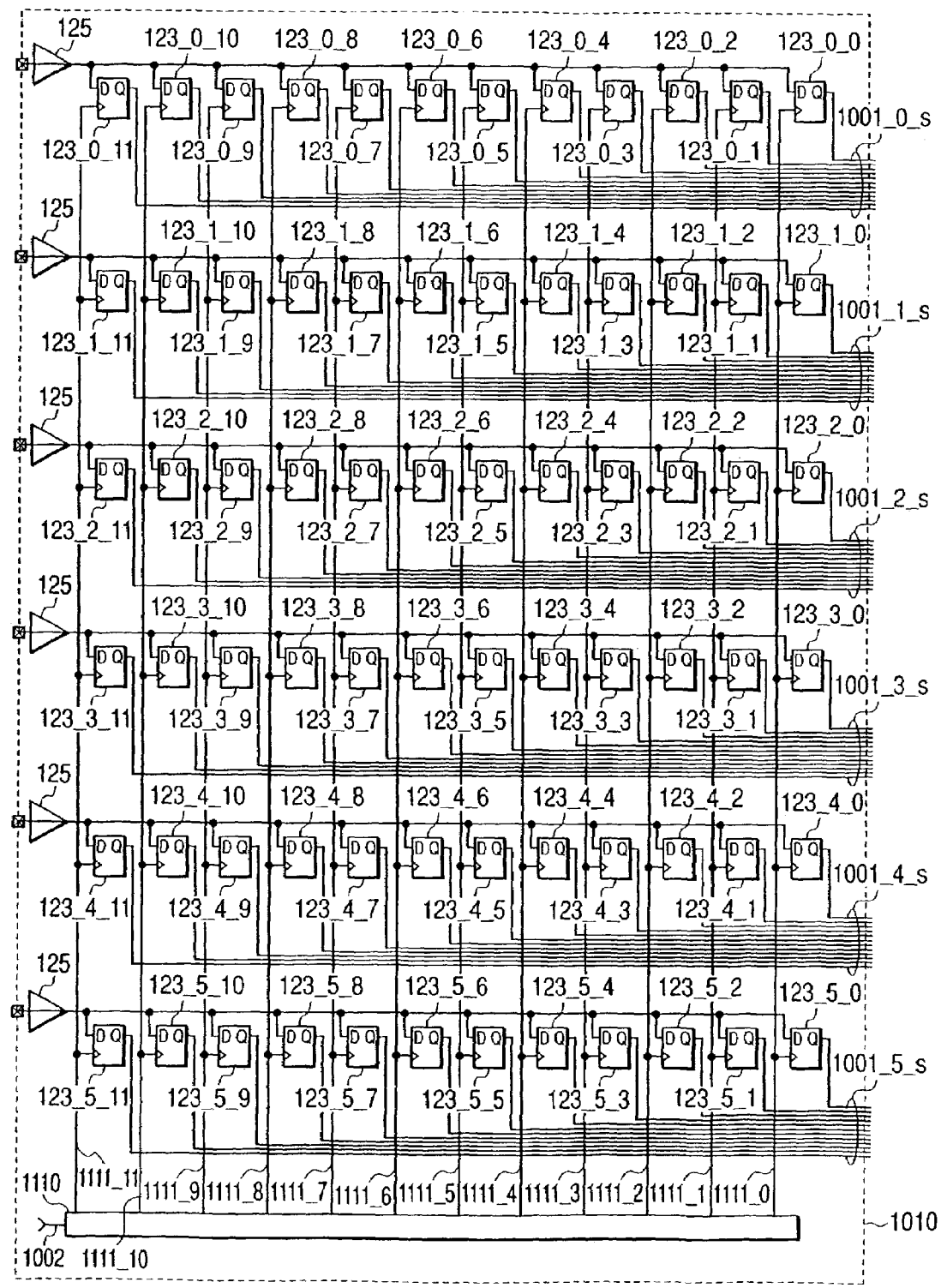
FIG. 13 is a block diagram showing an example of a data sampling circuit of FIG. 12.
Figure 14:
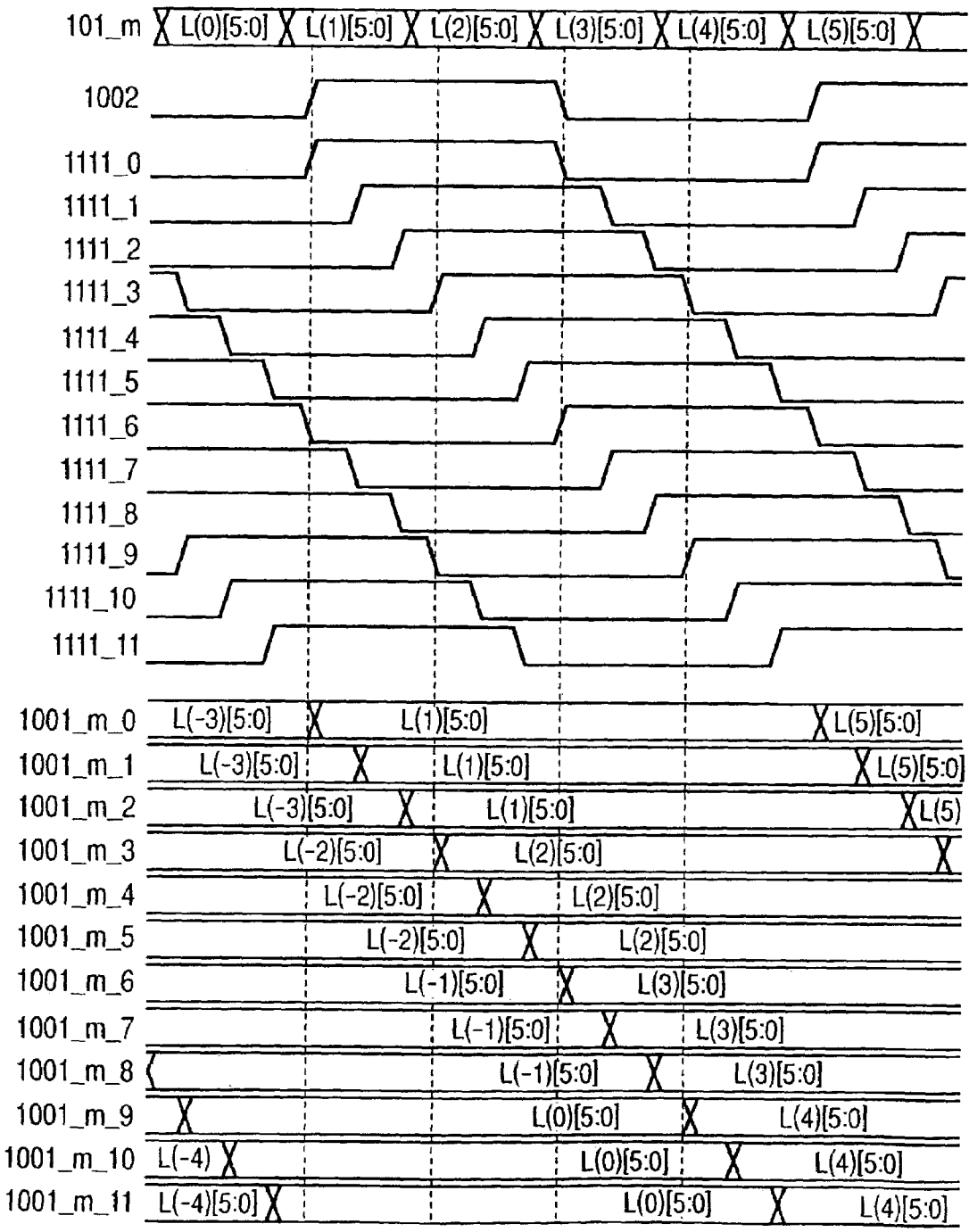
FIG. 14 is a timing chart for explaining an example of the operation of the data sampling circuit of FIG. 13.

FIG. 13 is a block diagram showing an example of the data sampling circuit 1010 in FIG. 12, and FIG. 14 is a timing chart for explaining an example of the operation of the circuit. The data sampling circuit 1010 has a PLL circuit 1110 for reception, and sampling clocks 1111_0 to 1111_11 (1111_s) of 12 phases are generated from a reception clock 1002 by the PLL circuit 1110 for reception. In the high-speed reception-side device 120_2, the cycle of the reception clock 1002 is equal to four times of the data transfer cycle tCK.

In the timing chart of FIG. 14, synchronously with the sampling clock 1111_s output from the PLL circuit 1110 for reception, the level of the transfer line 101_m is sampled. Each level of the transfer line 101_m is sampled about three times (triple over-sampling) and the resultant is output as sampling data 1001_m_s of 72 bits (6×4×3) to the data decoding circuit 1020.

Figure 16:
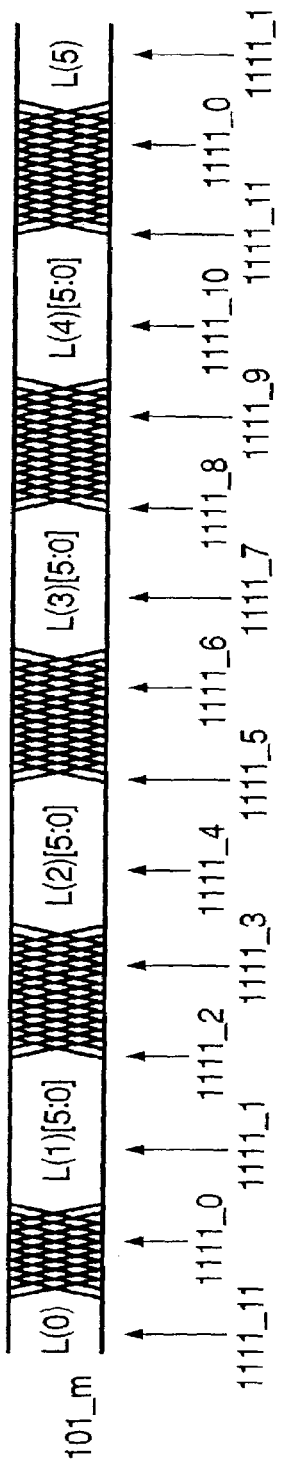
FIG. 16 is a waveform chart showing the relation between a sampling clock and a jitter of a transmission line in the example of FIG. 12.

The advantages of such over-sampling in the embodiment will be described. FIG. 16 is a timing chart showing the level L(t)[m] of the transmission line 101_m with respect to the sampling clocks 1111_s. As shown in FIG. 16, due to a jitter and a skew in the transmission line 101_m, a jitter of the PLL for reception, and the like, a jitter occurs in the timing of the level L(t)[m] of the transmission line 101_m with respect to the sampling clocks 1111_s.

In the example of FIG. 16, only the level L(t)[m] sampled synchronously with the sampling clock 1111_(3r+1) is accurate. The other sampling data is influenced by the jitter, and there is the possibility that the immediately preceding or subsequent level is sampled. By performing the triple over-sampling, it can be expected that at least one of the three pieces of sampling data is accurate.

Figure 15:
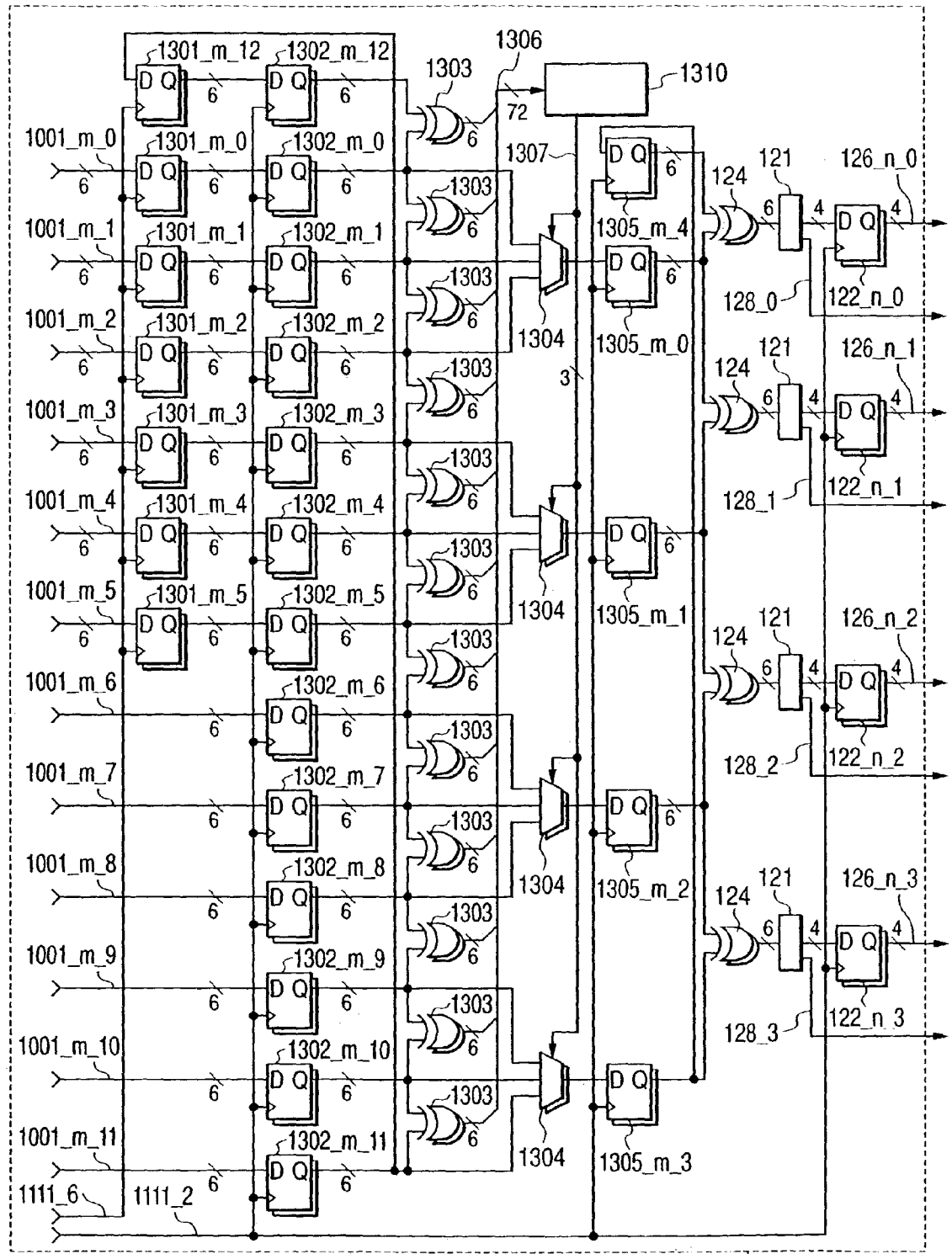
FIG. 15 is a block diagram showing an example of a decoder in FIG. 12.

FIG. 15 is a block diagram showing an example of the decoding circuit 1020 in FIG. 12. The sampling data 1001_m_s is decoded by the decoding circuit 1020. In FIG. 15, attention has to be paid to the fact that, to simplify the drawing, the m direction is omitted. To decode the accurate data D(t)[3:0], the decoding circuit 1020 has to select accurately sampled data from the sampling data 1001_m_s sampled synchronously with the sampling clocks 1111_(3r), 1111_(3r+1), and 1111_(3r+2). Attention is therefore paid to transition in data.

Figure 17:
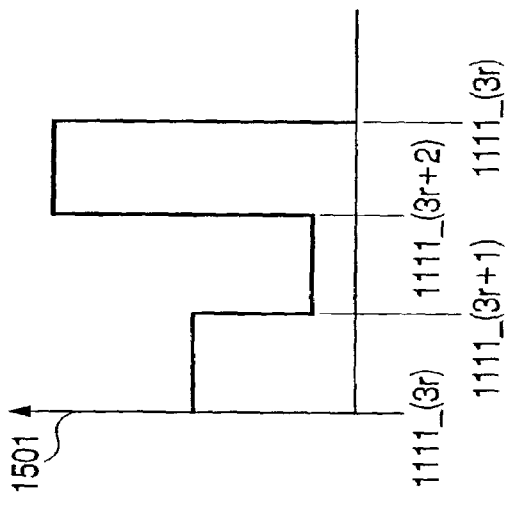
FIG. 17 is an explanatory diagram showing the relation between the sampling clock in the example of FIG. 12 and transition probability of a transmission line.

As shown in FIG. 17, transition takes place the most between 1111_(3r+2) and 1111_(3r), transition occurs the second most between 1111_(3r) and 1111_(3r+1), and transition hardly occurs between 1111_(3r+1) and 1111_(3r+2). It can be therefore determined that the sampling data 1001_m_(3r+1) sampled synchronously with the sampling clock 1111_(3r+1) is accurate.

Based on the above, the operation of the data decoding circuit 1020 will be described with reference to FIG. 15. Signal transition in the data decoding circuit 1020 is shown in the timing chart of FIG. 18. First, the phases of the sampling data 1001_m_s are not aligned as shown in FIG. 18. Since it is difficult to perform a process in such a state, the phases are aligned by D-type flip-flops 1301_m_s and 1302_m_s. Since the phases of the clocks 1111_2 and 1111_8 supplied to the D-type flip-flops 1301_m_s and 1302_m_s are deviated from each other by 180°, margins are provided for the setup time and hold time of each D-type flip-flop.

In the flip-flop 1302_m_12, data of 1302_m_11 in the immediately preceding cycle is held. Next, in order to detect transition, exclusive OR computation of the neighboring D-type flip-flop 1302_m_s is executed by an exclusive OR circuit 1303. Computed 72-bit transition data 1306 is input to a counting circuit 1310 to determine accurately sampled data from the sampled data 1001_m_(3r), 1001_m_(3r+1), and 1001_m_(3r+2).

The selected sampling data 1001_m_s is latched by a D-type flip flop 1305_m_t. In a D-type flip-flop 1305_m_4, data of 1305_m_3 in the immediately preceding cycle is held. By using the level L(t)[m] of the transmission line held in the D-type flip-flop 1305_m_t, data is decoded, and the resultant is output as data 126_n_t of 16 bits.

Since the data valid flag 128 as one of outputs of the decoder 121 is not used in the high-speed reception-side device 120_2, the circuit for the data valid flag 128 can be omit from the decoder 121. However, since it can be used for determining whether decoded data is an accurate value or not, in the embodiment, the circuit remains for the purpose.

The factor which limits the reception speed in the high-speed reception-side device 120_2 is either processing time tCN in the counting circuit 1310 or processing time tDE in the decoder 121. Even if the delay time tEO of the exclusive OR circuits 1303 and 124 is ignored, the cycle time of the reception clock 1002 has to be longer than tCN and tDE. In this case, the cycle time tCK of the reception data is ¼ of the cycle time of the reception clock 1002.

When it is assumed that tCN is shorter than tDE, and tDE and tEN are almost equal to each other, by supplying the same clock as the transmission clock 118 and the reception clock 1002, data is transmitted/received accurately between the high-speed transmission-side device 110_2 and the high-speed reception-side device 120_2. Even if tCN or tDE is longer than tDE, feedback is not performed in the process in the high-speed reception-side device 120_2. Therefore, pipeline processing can be easily performed, so that the operation speed of the circuit can be increased according to required communication speed.

Although the transmission-side device and the reception-side device are shown in the embodiments of FIGS. 9 and 12, it is rare that only the transmission-side device or reception-side device is required for the configuration of an IC. It is rather common that both the transmission-side device and the reception-side device are integrated on a single IC. That is, when data communication is performed between ICs, it is rare that data is transmitted from one IC to the other IC. Data is bidirectionally transmitted between the two ICs. For example, between a processor and a memory, in a writing operation, data is transmitted from the processor to the memory. In a reading operation, data is transmitted from the memory to the processor. In the specification, therefore, the transmission-side device and the reception-side device are concepts seen from the direction of data communication. In an actual system, when there is one semiconductor integrated circuit device, it is used as a transmission-side device. In another case, it is used as a reception-side device.

Therefore, in the case of integrating both the high-speed transmission-side device 110_2 and the high-speed reception-side device 120_2 on a single IC, by using the PLL circuit 710 for transmission or the PLL circuit 1110 for reception as a common transmission/reception circuit, the circuit area and power consumption can be reduced. For example, a method of mounting only the PLL circuit 1110 for reception and using clock signals 1111_0, 1111_3, 1111_6, and 1111_9 as clock signals 711, 712, 713, and 714, respectively, may be considered.

Although two reception circuits are shown in the embodiments of FIGS. 9 and 12, the method of constructing a reception circuit by using the characteristic such that transition takes place in the level of a transmission line is not limited to the two circuits. The configurations of some reception-side devices will now be described.

Figure 19:
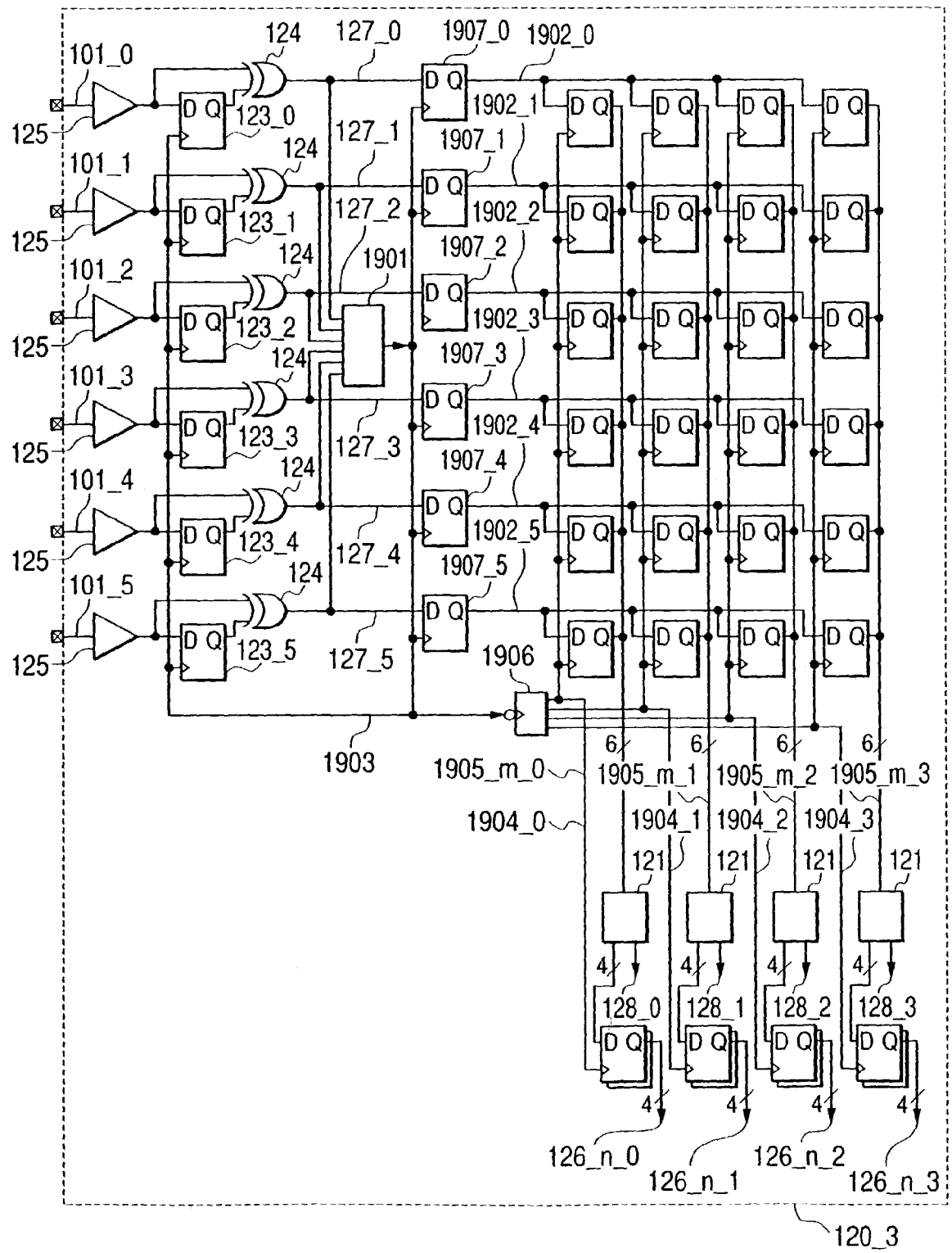
FIG. 19 is a block diagram showing another example of a reception circuit used for the invention.
Figure 22:
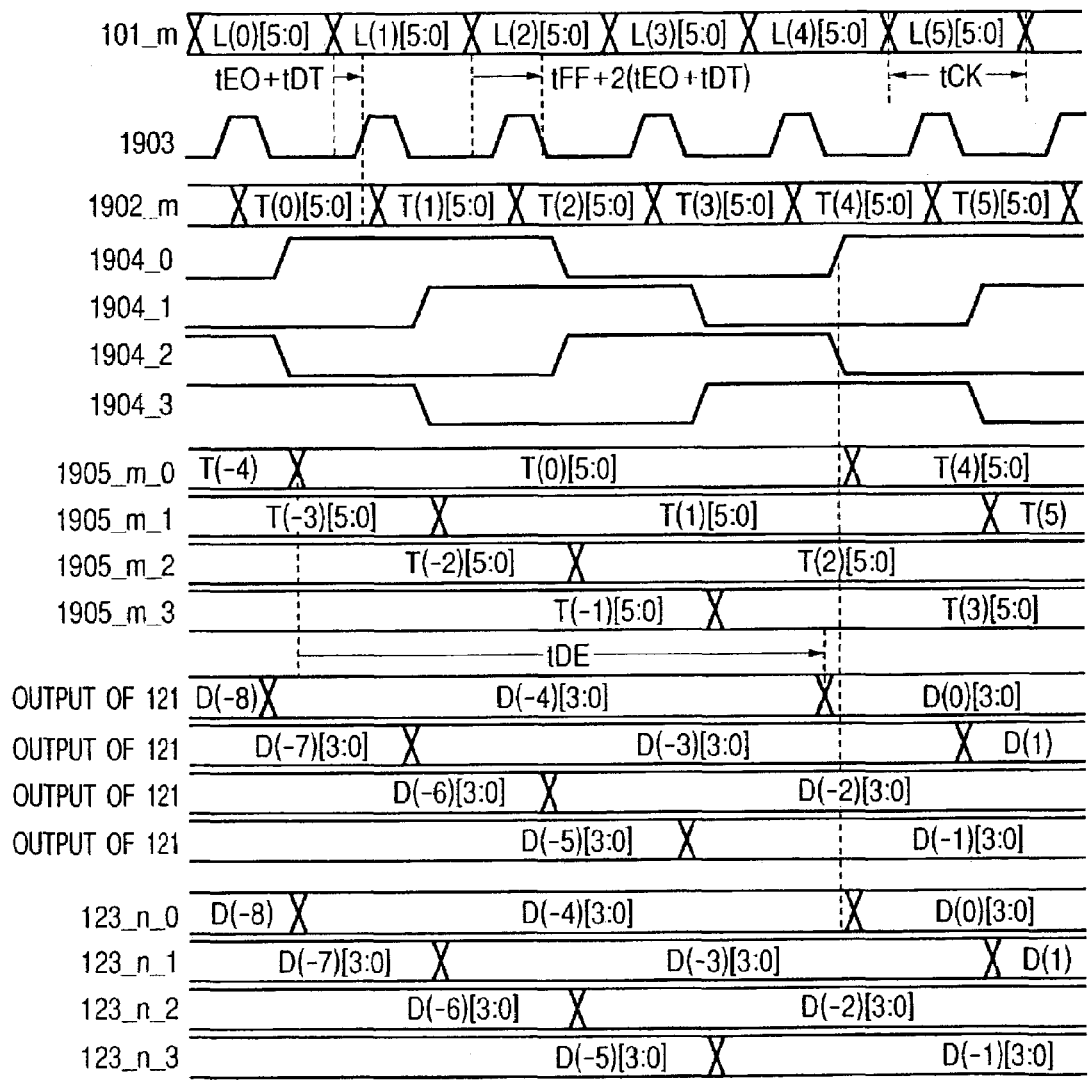
FIG. 22 is a timing chart for explaining an example of the operation of the example of FIG. 19.

FIG. 19 is a block diagram showing another example of the reception circuit used for the invention. The example is directed to a three-bit transition detecting type reception-side circuit 120_3. FIG. 22 is a timing chart for explaining an example of the operation of the circuit. The reception circuit 120_3 in the example will be described by referring to FIGS. 19 and 22.

The level L(t)[m] is received from the transmission line 101_m. In the D-type flip-flop 123_m, the level L(t−1)[m] of the transmission line of the immediately preceding cycle is held, and the exclusive OR circuit 124 outputs the transition code T(t)[m]. When three bits or more in an output 127_m of the exclusive OR circuit 124 indicate "1", a 3-bit detection circuit 1901 outputs the value "1" as a 3-bit detection signal 1903. Time required for the 3-bit detection circuit 1901 to detect that three or more bits indicate "1" is set as tDT. At the rising edge of the 3-bit detection signal 1903, the D-type flip-flop 123_m latches the level L(t)[m] of the transmission line and the D-type flip-flop 1907_m latches the transition code T(t)[m].

A ¼ frequency divider 1906 outputs four ¼-frequency-divided clock signals 1904_s of different phases synchronously with the falling edge of the 3-bit detection signal 1903. At the rising edge of the ¼-frequency-divided clock signal 1904_s, each of the D-type flip-flops latches the transition code T(t)[m] on 1902_m and outputs it to 1905_m_s.

Since the signal 1904_s is a ¼-frequency-divided clock, the transition code T(t)[m] on 1905_m_s is held for the period of 4×tCK. The decoder 121 decodes the transition code T(t)[m] on 1905_m_s, thereby obtaining data D(t)[n]. Finally, the data D(t)[n] is latched by the D-type flip-flop and is output as 126_n_s. The data valid flags 128_s are output from the decoders 121 and used as signals for determining whether data output from 126_n_s has been accurately decoded or not.

The minimum value of tCK in the 3-bit transition detection type reception circuit 120_3 of the example is defined by the following expressions 7 and 8.

$$4 \times tCK > tDF + tFF \qquad (7)$$

$$tCK > tFF + 2(tEO + tDF) \qquad (8)$$

Expression 7 defines the value by permissible time as decoding time tDE of the decoder 121. Expression 8 defines the value by time in which, first, the 3-bit detection circuit 1901 detects transition in three bits, the 3-bit detection signal 1903 goes high (tEO+tDT), after that, the D-type flip-flop 123_m latches the level of the transmission line (tFF), so that all of outputs of the exclusive OR circuit 124 become "0", and the 3-bit detection signal 1903 goes low (tEO+tDT). When Expression 8 is not satisfied, the level of the transmission line shifts before the 3-bit detection signal 1903 goes low, and the rising edge of the following 3-bit detection signal 1903 disappears.

The definition of Expression 7 out of the two expressions can be made correspond to shorter tCK by either increasing the number of the decoders 121 provided in parallel (four in this example) or forming the decoder 121 in a pipeline manner. Therefore, the shortest tCK which can be received by the 3-bit transition detection type reception circuit 120_3 is determined by the detection time tDT of the 3-bit detection circuit 1901 as understood from Expression 8. Consequently, it becomes important to increase processing speed of the 3-bit detection circuit 1901. By constructing the 3-bit detection circuit 1901 by an analog circuit shown in FIGS. 20 and 21 which will be described hereinbelow, the speed is increased more as compared with the case of using a digital circuit.

Figure 20:
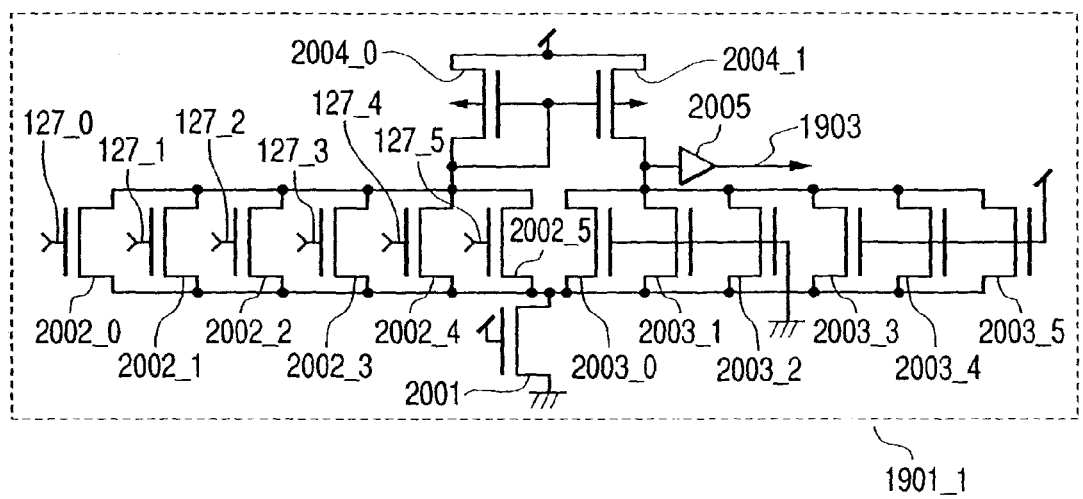
FIG. 20 is a circuit diagram showing an example of a 3-bit detection circuit used for the invention.

FIG. 20 is a circuit diagram showing an example of a 3-bit detection circuit used for the invention. The example is directed to a differential 3-bit detection circuit 1901_1. 2002_0 to 2002_5 arranged in parallel and 2003_0 to 2003_4 arranged in parallel denote N-channel type MOSFETs having the same current driving force. The current driving force of one MOSFET is set as In. 2003_5 connected to the MOSFETs 2003_0 to 2003_4 in parallel denotes an N-channel type MOSFET having a current driving force 0.5 In which is the half of In.

The gate terminals of the MOSFETs 2003_0 to 2003_2 are grounded, and the gate terminals of the MOSFETs 2003_3 to 2003_5 are connected to the power source. Therefore, the MOSFETs 2003_0 to 2003_5 have a total current driving force of 2.5 In. To the MOSFETs 2002_0 to 2002_5 formed so as to have a differential form with the MOSFETs 2003_0 to 2003_5, six input signals 127_m are input in the above-described example. The total current driving force of the MOSFETs 2002_0 to 2002_5 is proportional to the number of the value "1" included in the input signals 127_m. For example, when "1" is set only for one bit, the current driving force is In. When four bits have the value "1", the current driving force is 4 In.

The difference between the total current driving force of the MOSFETs 2002_m and the total current driving force of the MOSFETs 2003_m is obtained by an active load constructed by P-channel MOSFETs 2004_0 and 2004_1 formed in a current mirror form. That is, the total current of the MOSFETs 2002_m is supplied to the MOSFETs 2003_m via the current mirror circuit formed by the MOSFETs 2004_0 and 2004_1.

When three bits or more in the input signal 127_m as an input of the inverter circuit 2005 are "1", a current output via the current mirror becomes 3 In or larger and is larger than the total current of 2.5 In of the MOSFETs 2003_0 to 2003_5. By the differential current, an output is charged up to the high level. On the other hand, when two bits or less in the input signal 127_m is "1", the current output via the current mirror becomes 2 In or less and becomes smaller than the total current of 2.5 In of the MOSFETs 2003_0 to 2003_5. By the differential current, an output is discharged to the low level. In such a manner, the output 1903 of the inverter 2005 is set to the high level when three bits or more in the input signal are "1" and is set to the low level when two bits or less are "1".

Figure 21:
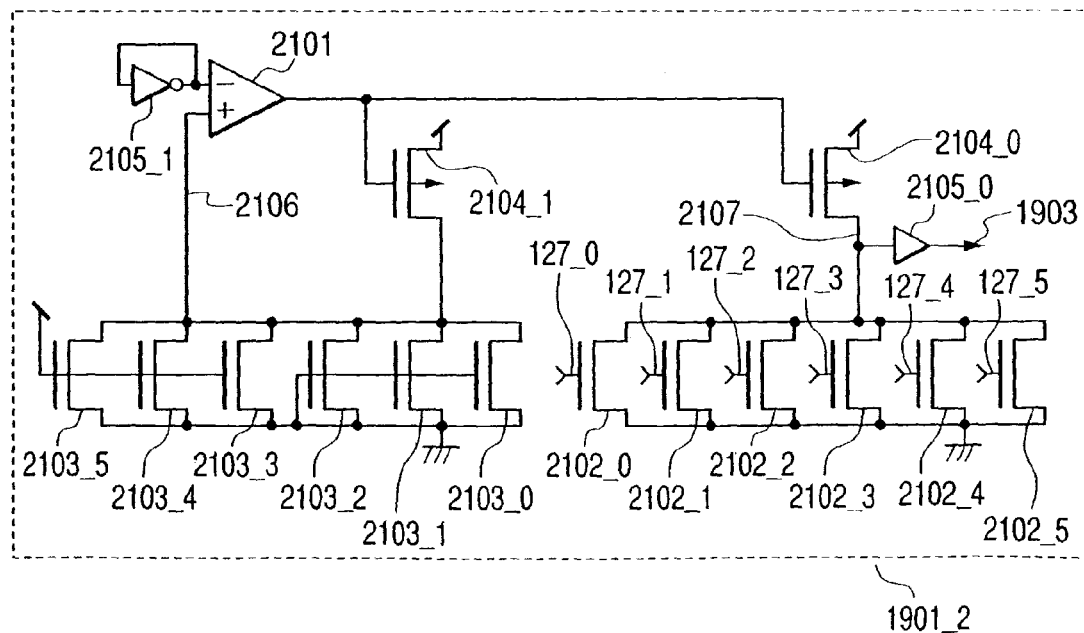
FIG. 21 is a circuit diagram showing another example of the 3-bit detection circuit used for the invention.

FIG. 21 is a circuit diagram showing another example of the 3-bit detection circuit used for the invention. N-channel MOSFETs 2102_0 to 2102_5 having gates to which input signals 127_0 to 127_5 are supplied and MOSFETs 2103_0 to 2103_4 are formed to have the same current driving force In. A MOSFET 2103_5 formed in parallel with the MOSFETs 2103_0 to 2103_4 is an N-channel MOSFET having the current driving force of 0.5 In which is the half of the current driving force In. The gate terminals of the MOSFETs 2103_0 to 2103_2 are grounded and the gate terminals of the MOSFETs 2103_3 to 2103_5 are connected to the power source corresponding to the high level of an input signal. Therefore, the MOSFETs 2103_0 to 2103_5 have the total current driving force of 2.5 In.

The input signal 127_m is input to the MOSFETs 2102_0 to 2102_5, and the total current driving force of the MOSFETs 2102_0 to 2102_5 is proportional to the number of the value "1". For example, when only one bit indicates "1", the current driving force is In. When four bits are "1", the current driving force is 4 In.

The gate potential of the P-channel type MOSFET 2104_1 is negative fed back by an operational amplifier 2101, and the potential of a signal 2106 is equal to the logic threshold of an inverter 2105_1. A P-channel type MOSFET 2104_0 is equivalent to a P-channel type MOSFET 2104_1, and the gate potentials are equal to each other. Therefore, the same current as that flowing in the P-channel type MOSFET 2104_1 is passed to the P-channel type MOSFET 2104_0.

Specifically, a current corresponding to the current 2.5 In flows from the P-channel type MOSFET 2104_0. Therefore, when the total current driving force of the N-channel type MOSFETs 2102_0 to 2102_5 is equal to or larger than the current 2.5 In supplied from the P-channel type MOSFET 2104_0 in correspondence with the input signal 127_m, the potential of a signal line 2107 is lower than the logic threshold of the inverter 2105_1. When the total current driving force of the N-channel type MOSFETS 2102_0 to 2102_5 is lower than 2.5 In, the potential of the signal line 2107 is higher than the logic threshold of the inverter 2105_1. It is designed so that the logic thresholds of the inverters 2105_0 and 2105_1 are equal to each other. When three bits or more in the signal 127_m are "1", "1" is output as the output 1903.

Figure 23:
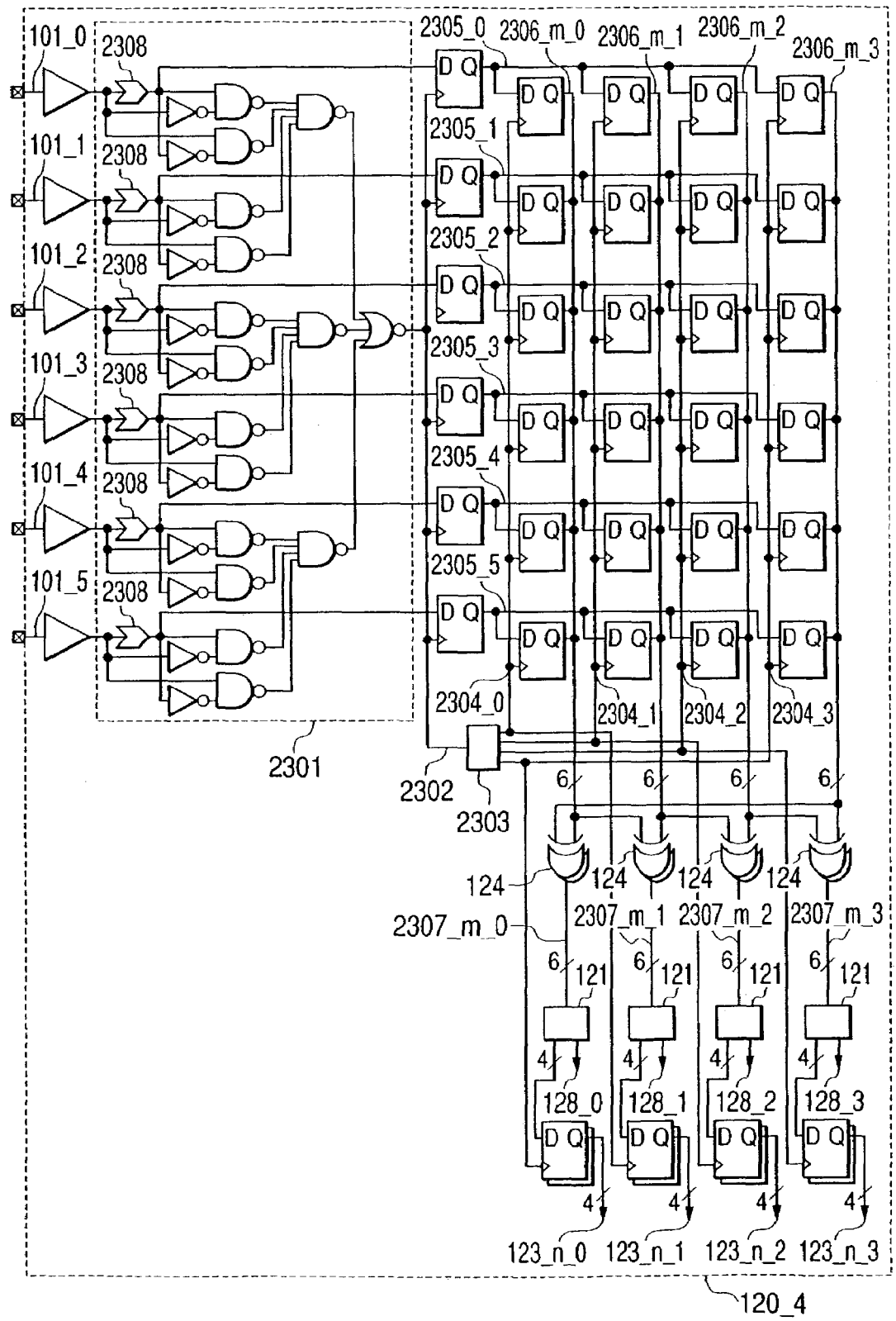
FIG. 23 is a block diagram showing another example of the reception circuit used for the invention.
Figure 24:
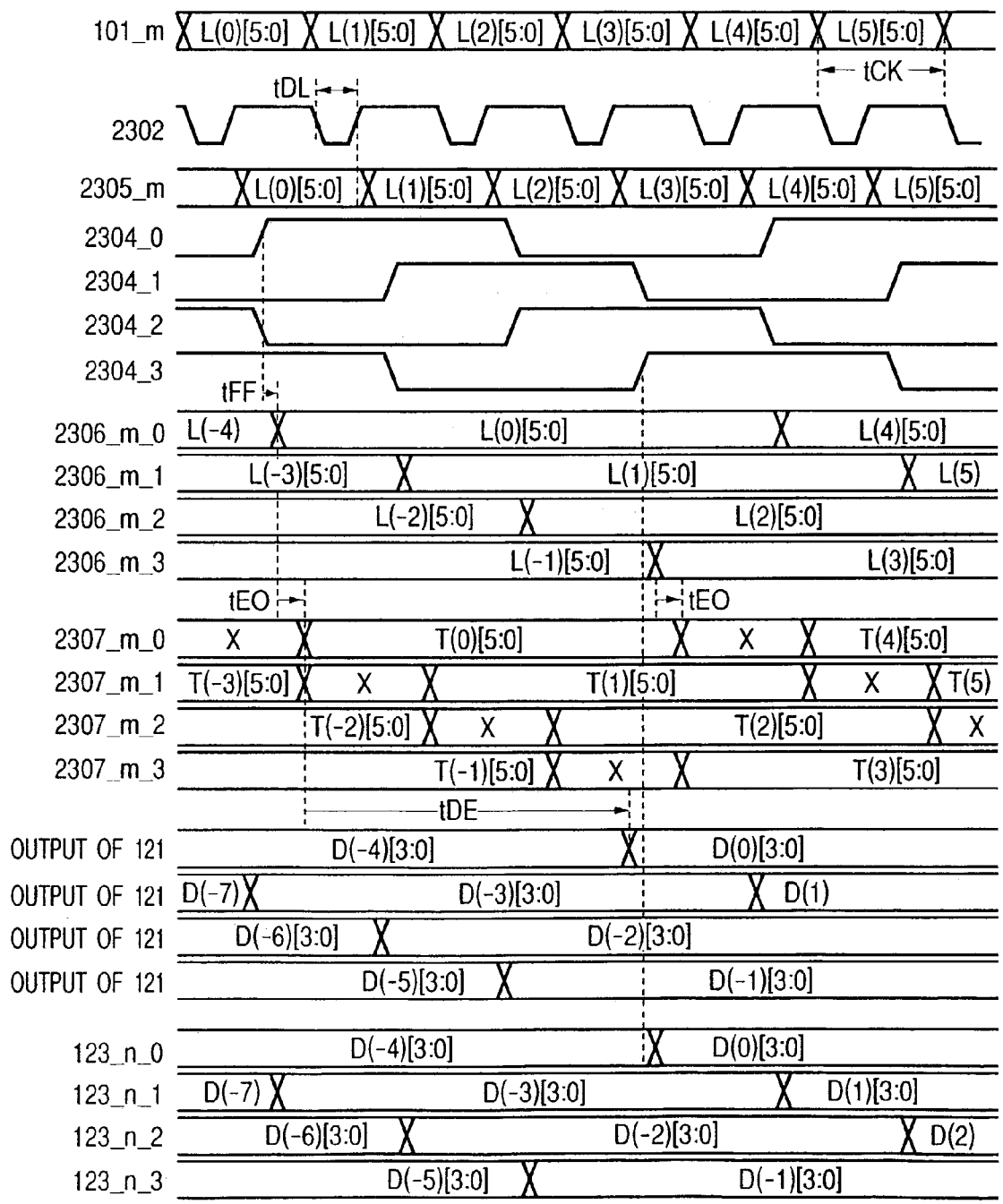
FIG. 24 is a timing chart for explaining the operation of the example of FIG. 23.

FIG. 23 is a block diagram showing another example of the reception circuit used for the invention. The reception circuit of the example is directed to an edge trigger type reception circuit 120_4. FIG. 24 is a timing chart for explaining an example of the operation. By using FIGS. 23 and 24, the edge trigger type reception circuit will be described.

The level L(t)[m] is input from the transmission line 101_m. When transition takes place in the level of the transmission line, an edge detection circuit 2301 detects the transition of the level. Concretely, when transition occurs in the level of the transmission line, an edge detection signal 2302 goes low, "0" is held for the period of a delay amount tDL of a delay circuit 2308, and after that, the value returns to "1". Synchronously with the rising edge of the edge detection signal 2302, the level L(t)[m] of the transmission line is held at D-FF, and a signal 2305_m is output.

In FIG. 24, the timings of transition of the level L(t)[m] of the transmission lines are the same. However, in reality, a skew occurs in signal lines. By suppressing the skew to tDL or less, it can be prevented that the edge detection signal 2302 goes high before the transition of the transmission line level finishes and a level which is not valid is latched by a D-type flip flop. In other words, it is necessary to set the delay amount tDL of the delay circuit 2308 so as to conceal the skew of the transmission line which occurs in the whole system.

A ¼ frequency divider 2303 is a circuit for outputting four ¼-frequency-divided clocks 2304_0 to 2304_3 having different phases synchronously with the rising edge of the edge detection signal 2302. The delay between the rising edge of the edge detection signal 2302 and the rising edge of the ¼-frequency-divided clocks 2304_0 to 2304_3 is designed so as to be slightly larger than the delay of the D-type flip-flop. Synchronously with the rising edges of the ¼-frequency-divided clocks 2304_0 to 2304_3, the level L(t)[m] of the transmission line is held in each of the D-type flip flops and is output to 2306_m_s (s=0 to 3).

The timing of the neighboring transmission line is computed by the exclusive OR circuit 124 and the held level 2306_m_s of the transmission line is output as a transition code T(t)[m] to 2307_m_s. As shown in FIG. 24, the transition code T(t)[m] is held for the period of about 3×tCK. The transition code T(t)[m] output to 2307_m_s is input to the decoder 121, and data D(t)[n] is output. The data D(t)[n] is further latched synchronously with the ¼-frequency-divided clocks 2304_0 t o2304_3, and is output as 123_n_s. By the data valid flag 128 output from the decoder 121 at this time, whether each data is accurately decoded or not can be checked.

The reception speed of the edge trigger type reception circuit 120_4 in the embodiment is defined by the window 401(b) and the skew 403(b) defined in FIG. 6. The window 401(b) has to be larger than tDL and the skew has to be smaller than tDL. Therefore, the minimum value of tCK is expressed by tDL+skew. As described above, tDL is designed so as to conceal the skew, in order to increase the reception speed of the edge trigger type reception circuit, it is important to suppress a jitter of the transmission line.

In the edge trigger type reception circuit as well, tCK is suppressed by the delay amount of the decoder 121.

$$3 \times tCK > tFF + tEO + tDE \quad (9)$$

In a manner similar to the other embodiments, by increasing the number of decoders connected in parallel (four in the example) or applying pipeline processing, the circuit can be made adapted to the smaller tCK.

Figure 25:
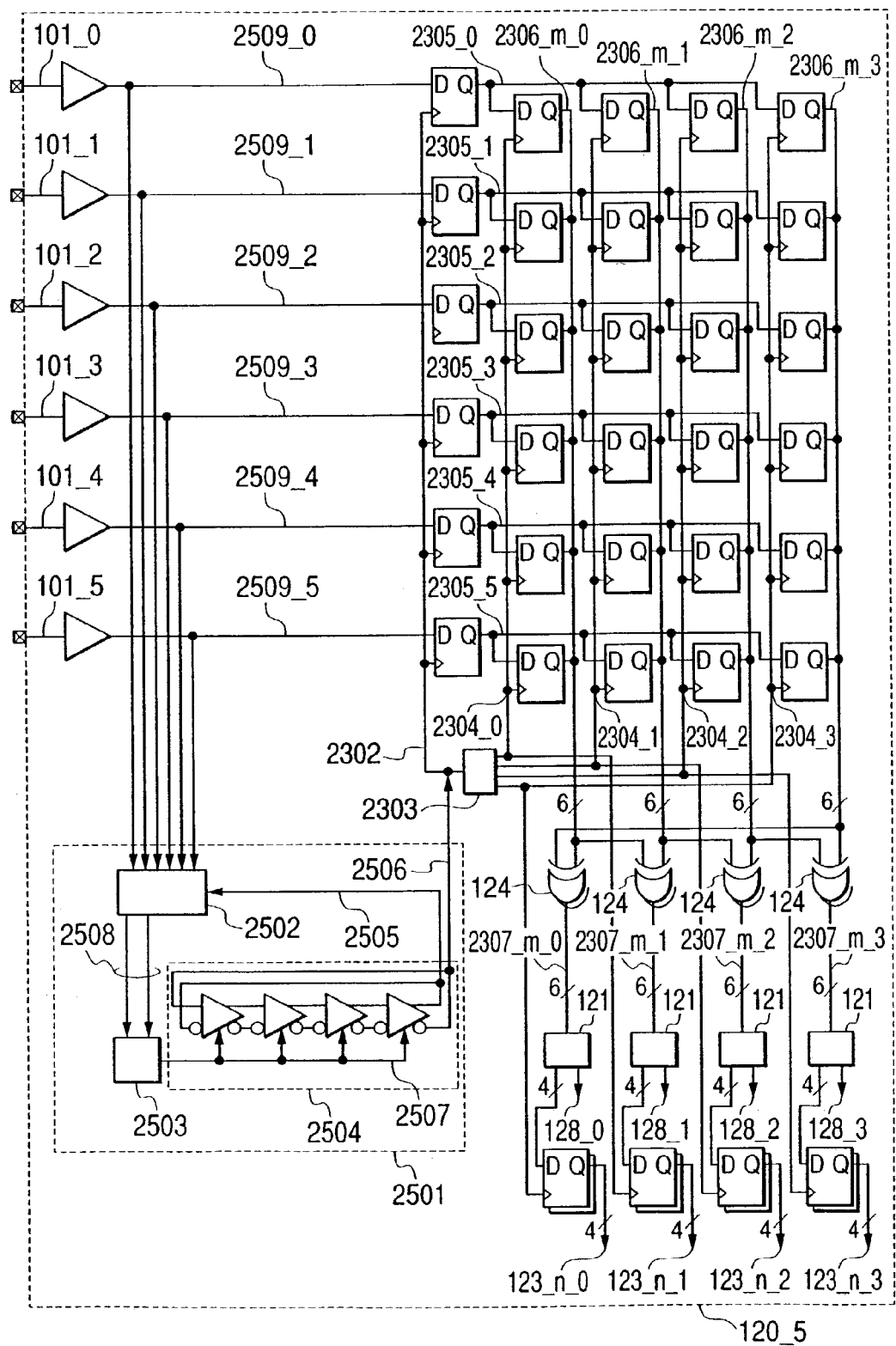
FIG. 25 is a block diagram showing another example of the reception circuit used for the invention.
Figure 26:
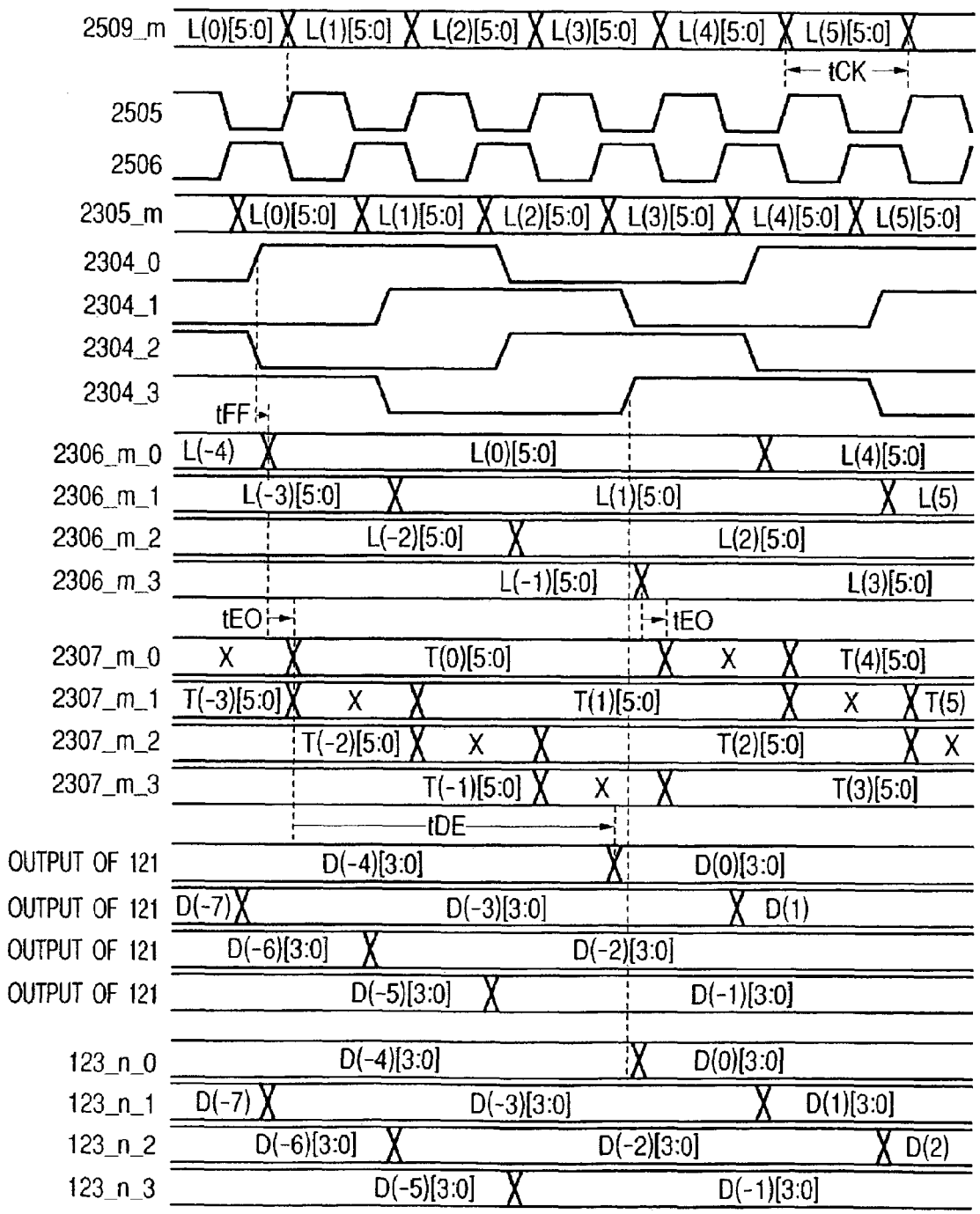
FIG. 26 is a timing chart for explaining an example of the operation of the example of FIG. 25.

FIG. 25 is a block diagram showing another example of the reception circuit used for the invention. The reception circuit of the example is directed to a PLL synchronization type reception circuit 120_5. FIG. 26 is a timing chart for explaining an example of the operation of the circuit. By referring to FIGS. 25 and 26, the PLL synchronization type reception circuit will be described.

The level L(t)[m] is input from the transmission line 101_m and becomes an internal signal 2505_m. A PLL 2501 performs negative feedback control so that the rising edge of a clock 2505 matches with transition of 2505_m. Concretely, the phase and frequency of the internal signal 2505_m are compared with those of the clock 2505 by a phase frequency detector (PFD) and a phase/frequency comparison signal 2508 is output.

A charge pump 2503 changes the value of a frequency control signal 2507 in accordance with the phase/frequency comparison signal 2508. A voltage controlled oscillator (VCO) changes an oscillation frequency in accordance with the value of the frequency control signal 2507 so that the rising edge of the clock 2505 matches with transition of 2505_m.

Synchronously with the rising edge of a clock 2506 having a phase opposite to that of the clock 2505, DFF latches the level L(t)[m] of the transmission line. Since the process after that is similar to that of the edge trigger type reception circuit 120_4 of the example of FIG. 23, its description will not be repeated.

The minimum value of tCK in the PLL synchronization type reception circuit 120_5 of the embodiment is determined by the minimum oscillation frequency of the PLL and Expression (9). By increasing the number of the decoders 121 connected in parallel or applying pipeline processing in a manner similar to the example of FIG. 23, Expression (9) can be made correspond to smaller tCK. Therefore, the minimum tCK of the PLL synchronization type reception circuit 120_5 depends on designing of a PLL of higher speed.

For simplicity of explanation, variations of the relation between the data D(t)[3:0] to be actually transferred and the signals L(t)[5:0] which appear on a transmission line have not been described. Obviously, it is an important point that transition always takes place on a transmission line per data, and there are other variations. In the foregoing embodiments, in order to emphasize the effect of preventing a jitter caused by the simultaneous switching noise, four bits are transferred by six transmission lines. However, when only an effect that transition always takes place on a transmission line per data is considered, it is sufficient that transition occurs at least one transmission line. Alternately, transition may occur in all of transmission lines. Consequently, by transferring 4-bit data via five transmission lines and setting the number of transitions to two or three per data, data transfer can be performed.

$$_5C_3 + {}_5C_2 = 20 \quad (10)$$

Also in the case where the number of transitions in transition lines is always constant, if the scale of the encoder an the decoder is not considered, efficiency of the number of bits per transfer with respect to the number of transmission lines can be improved. When m transmission lines are used and transition always takes place in u transmission lines, an amount of information which can be transferred at a time can be expressed by the following expression (6).

$$\text{Log}_2({}_mC_u) \text{ bits}$$

As an example, when m=40 and u=20 (=40/2), the amount of information which can be transferred is slightly more than 37 bits. Therefore, the bit efficiency of the transmission line is 37/40×100=92.5%. In the above-described case where m=6 and u=3, 4/6×100=66.7%. Although it is easily assumed from Expression 6, as m increases, the higher the bit efficiency of the transmission line becomes. In the case where m is fixed, the bit efficiency becomes the highest when u=m/2.

Figure 8:
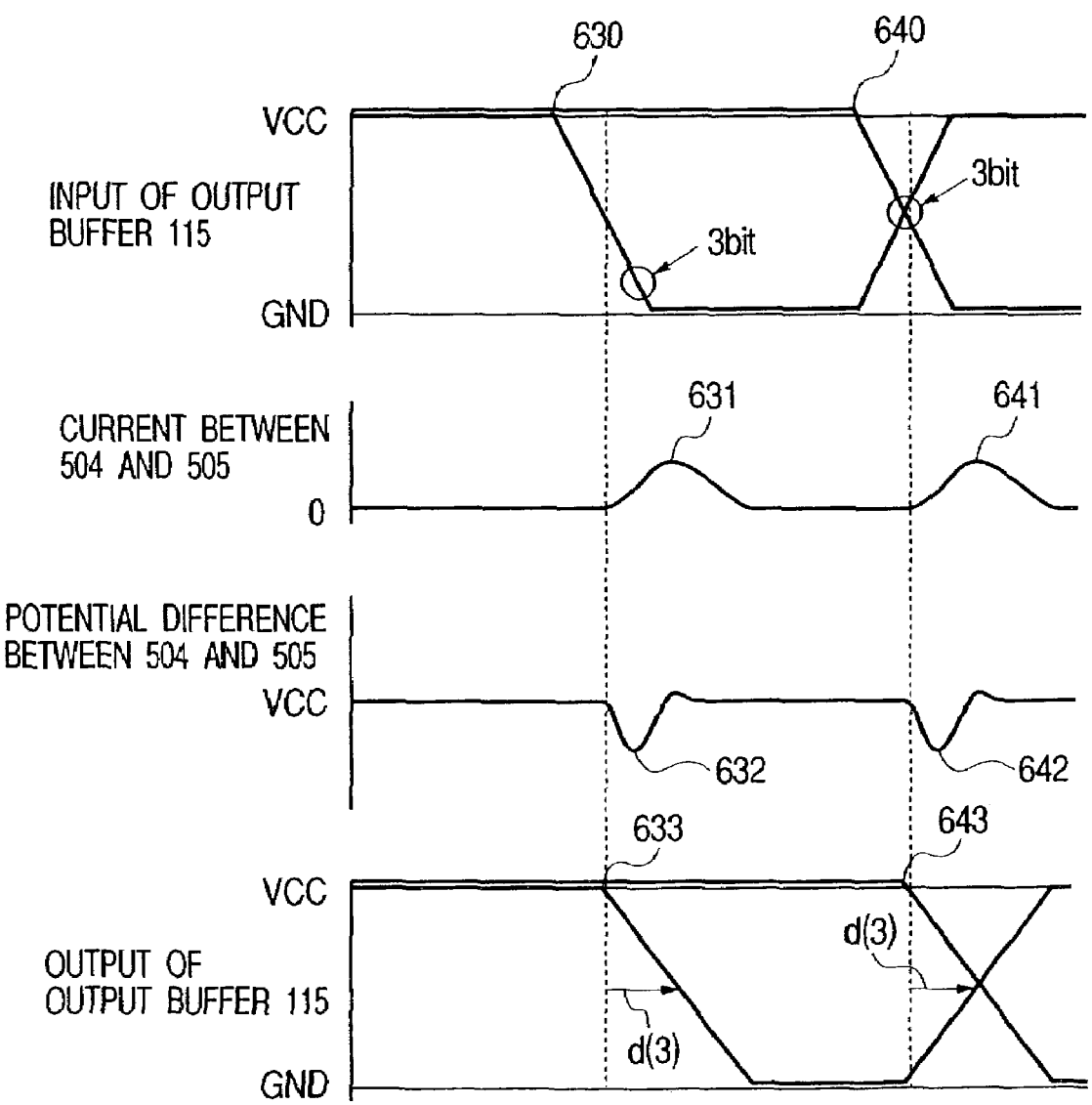
FIG. 8 is a waveform chart for explaining the operation of the equivalent circuit of FIG. 7.

Further, by properly selecting the values m and u, the influence of the simultaneous switching noise can be further reduced. In FIG. 8, the simultaneous switching noise depends on only the number of transmission lines in which transition occurs irrespective of a transition pattern of the transmission line level. However, to be strict, due to difference between the characteristics of an N-channel type MOSFET and those of a P-channel type MOSFET used for an output buffer, the current waveform of rising ("0" to "1") in the transmission line level and that of falling ("1" to "0") are different from each other.

When m=12 and u=6, by encoding/decoding the transmission code T(t)[11:0] while considering the immediately-preceding transmission line level L(t1) [11:0], the number of rising edges and the number of falling edges in a transmission line can be equalized. Obviously, in this case, six transmission lines have the value "1" and the other six transmission lines have the value "0" in the initial values L(0)[11:0] of the transmission line level. In this case, the number of bits which can be transferred is twice as many as that in the case where m=6 and u=3.

That is, when it is assumed that transition coding is performed in each of a transmission line where L(t−1)[m] is "1" and a transmission line of "0", designing is facilitated. Advantages of equalizing the number of rising edges and the number of falling edges of the transmission line level are reduction of the simultaneous switching noise and also the fact that the circuit can be adapted to an output buffer of an open drain type. The transmission/reception circuit in the invention is used by itself or used with other functional circuits. For example, the transmission/reception circuit can be applied for communication between an arithmetic processing device and a storage device.

Figure 27:
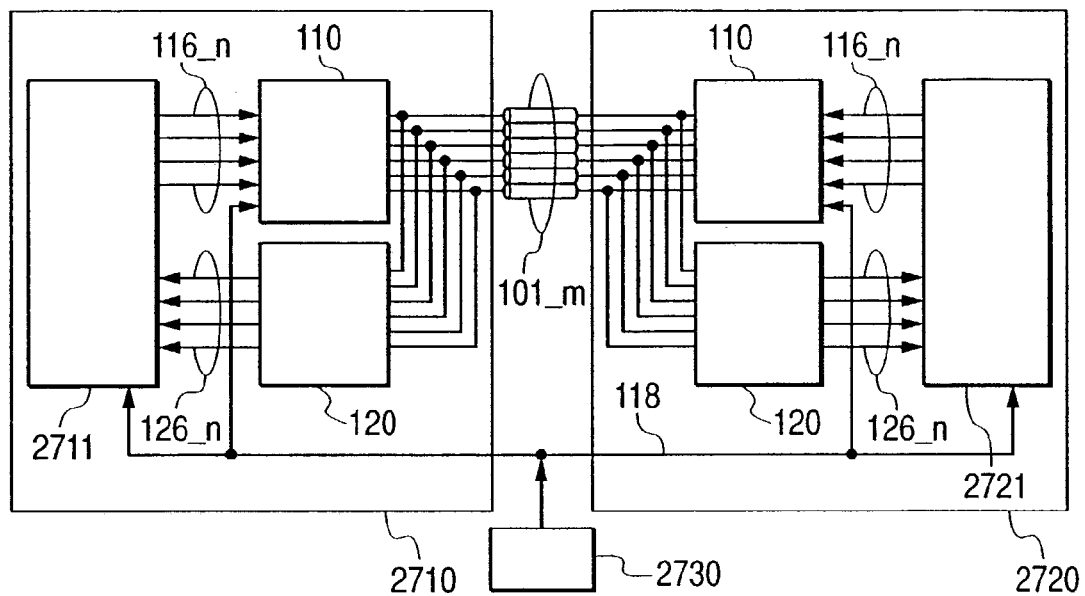
FIG. 27 is a block diagram showing an example of the data communication device according to the invention.

FIG. 27 is a block diagram of an example of the data communication device according to the invention. The data communication device of the embodiment is directed to a case where transmission and reception circuits are integrated in an IC. An arithmetic processor 2711, the transmission-side device 110, and the reception-side device 120 are integrated as a single arithmetic processing IC 2710. Similarly, a storage device 2721, the transmission-side device 110, and the reception-side device 120 are integrated as a single storage IC 2720. In the IC, it is easy to compensate the timing skew, so that timing skews of signals 116_n and 126_n for parallel transmission hardly become an issue. The semiconductor integrated circuit devices 2710 and 2720 are mounted on a mounting board such as a printed board, and the transmission line 101_m is formed by a printed wire formed on the printed board.

Figure 28:
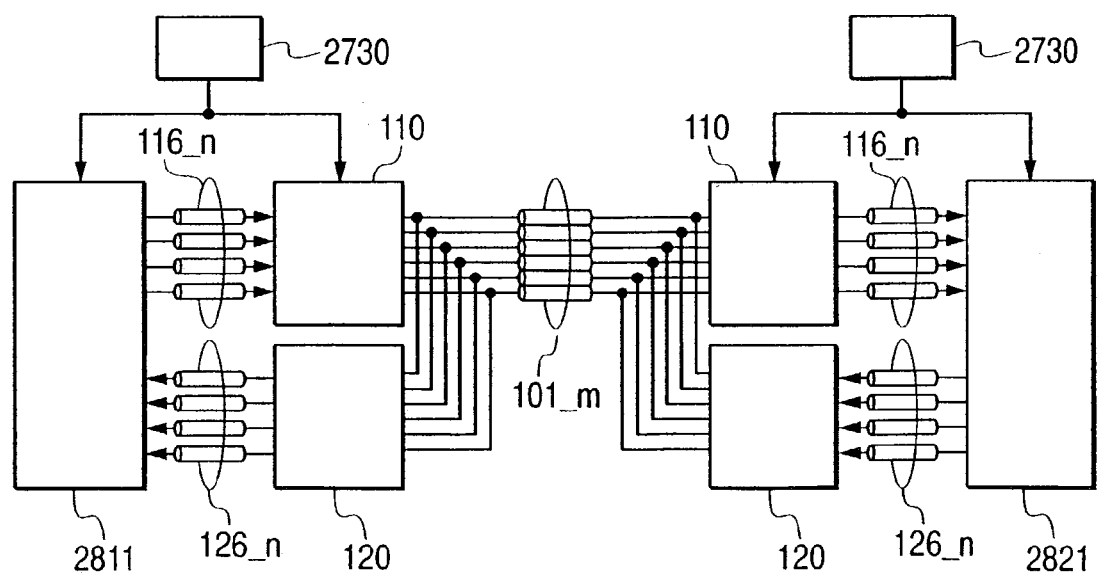
FIG. 28 is a block diagram showing another example of the data communication device according to the invention.

FIG. 28 is a block diagram showing another embodiment of the data communication device according to the invention. Different from FIG. 27 in which the transmission-side device and the reception-side device are integrated in an IC, transmission-side and reception-side devices in the data communication device of the embodiment are externally provided for an IC. As shown in FIG. 28, separately from an arithmetic processing IC 2810, the transmission-side device 110 and the reception-side device 120 are mounted. The arithmetic processing IC 2810 and the transmission-side and reception-side devices are connected by parallel link.

Similarly, the transmission-side device 110 and the reception-side device 120 are mounted separately from a storage IC 2820, and the storage IC 2820 and the transmission-side and reception-side devices are connected by parallel link. As compared with the distance between the arithmetic processing IC and the storage IC, generally, the distance between the arithmetic processing IC 2810 and the transmission-side and reception-side devices or the distance between the storage IC 2820 and the transmission-side and reception-side devices can be made short. Thus, an influence of the timing skew can be suppressed.

Although not particularly limited, the arithmetic processing IC 2810 and the storage IC 2820 are formed by existing semiconductor chips, combined with semiconductor chips serving as the transmission-side device 110 and the reception-side device 120 to which the invention is applied, and the semiconductor chips are sealed with the same package, thereby obtaining an apparently-single semiconductor integrated circuit device. In the configuration, the distance between the arithmetic processing IC 2810 and the transmission/reception-side devices or the distance between the storage IC 2820 and the transmission/reception-side devices can be generally made short. Alternately, they are connected to each other via bonding wires, thereby achieving connection in which the influence of the inductance component of an external terminal is eliminated.

Clock signals have to be supplied to the transmission-side devices 110 and 110_2 and the high-speed reception-side device 120_2 in the invention. In this case, there are a configuration of using one clock generating circuit 2730 and supplying the same clock to the arithmetic processing device side and the storage device side like the embodiment of FIG. 27 and a configuration of using a plurality of clock generating circuits 2730 and supplying different clocks to the arithmetic processing device side and the storage device side like the embodiment of FIG. 28.

Generally, in the case of supplying different clocks to the arithmetic processing device side and the storage device side like in FIG. 28, a very small deviation between clock oscillation cycles and phases, which occurs in the plurality of clock generating circuits 2730 becomes an issue. In the reception-side device of the invention, however, it is unnecessary to supply clocks to the reception-side device except for the high-speed reception-side device 120_2. Even when the cycles and phases of clocks of the transmission-side and reception-side devices are deviated from each other, data can be received accurately. Also in the high-speed reception-side device 120_2, by changing a process after performing an over-sampling process, even when the cycles and phases of clocks are deviated from each other, it is easy to receive data accurately.

Although the data transfer between ICs of a semiconductor integrated circuit devices has been described above, it is easy to apply the invention to data transfer in an IC. For example, in the case of designing an SOC (System On a Chip) for integrating a system on an IC by combining an IP (Intellectual Property) formed as a library, the circuit blocks in FIGS. 27 and 28 can be formed on a single semiconductor substrate.

As an example of application, in such a system LSI, by applying the invention to communication between functional block (functional unit) IPs, the IPs are connected to each other at high speed, and a wiring area can be reduced. Obviously, an MCM (Multi Chip Module) in which a plurality of ICs are sealed in a package is similar to the above.

The configuration of data encoding shown in FIG. 3 of the transmission-side device and that of the reception-side device have to be the same but do not have to be fixed. By making a conversion table variable, the invention can be applied to so-called data encryption of concealing the contents of data passing on an external transmission line.

Data communication between an arithmetic processing IC and a storage IC as stated above will now be described as an example. In a writing operation, the arithmetic processing IC designates a specific address to the storage IC, and transmits an instruction of writing operation and data to be written. In the data communication of this case, therefore, the address signal, a write flag, and write data are encoded and transmitted as described above. In a 4-bit parallel link as described above, the address, flag, and data are transferred a plurality of times in serial. In a reading operation, the arithmetic processing IC performs data communication of designating a specific address in the storage IC. In the storage IC, a designated memory cell is selected, and stored data is read. The storage IC performs the data communication of the stored data to the arithmetic processing IC.

Since the embodiment is characterized by high-speed data communication, it is directed to perform communication of a large amount of data. Therefore, in writing or reading data of about four bits, by performing an operation as described above, an effect which is not so large is produced. Consequently, in the writing operation, in the arithmetic processing IC, a specific address range is designated, and a writing operation instruction and a large amount of data to be written are transmitted. In the storage IC, memory cells in the address range are continuously selected and the received data is written.

In the reading operation, a specific address range is designated by the arithmetic processing IC. In the storage IC, the memory cells in the designated address range are continuously selected and the stored data is read and continuously transmitted. In this case, if the speed of the memory selecting operation of the storage IC and the data communication speed do not coincide with each other, it is sufficient to provide the storage IC with a buffer memory to adjust the time. Such a buffer memory may be provided for the arithmetic processing IC.

In a system in which a plurality of peripheral devices are mounted on the transmission line, a device address is assigned to each of the peripheral devices including the storage IC. By using the device addresses, data communication between specific ICs is performed. When a plurality of devices are connected to a transmission line, it is necessary to adjust which one of the devices has the right of using the transmission line. It is sufficient to provide each device with an adjusting circuit regarding usage of the transmission line or to provide a dedicated adjusting circuit on the system. For such adjustment of a transmission line, the commands (Command0, Command1, and Command2) can be used.

Actions and effects obtained from the foregoing embodiments are as follows.

(1) By encoding data of N bits (N being 2 or larger) to transmission data of M bits (M being 3 or larger) on a transmission side, generating a transmission signal in which transition takes place in at least one level of any of the transmission data synchronously with a transmission clock and transmitting the transmission signal to a transmission line on the transmission side, recognizing transition in the signal of the M bits received via the transmission line and detecting the reception data of the M bits synchronized with the transmission clock on a reception side, and decoding the M-bit reception data to the original N-bit data on the reception side, effects are produced such that it becomes unnecessary to set a time margin for a jitter in a clock and a skew of data and expansion of the timing margin or increase in data transfer speed can be realized.

(2) In addition, the transmission data is encoded so that at least one bit out of the M bits has one of binary logic values, the level of the transmission data having the one of the logic values in the M-bit transmission data in the transmission signal is shifted synchronously with the transmission clock, and the transmission data having the other logic value is maintained at the same level, thereby producing an effect such that a transmission signal having level transition in correspondence with the transmission data synchronously with the transmission clock can be generated with a simple configuration.

(3) In addition, two or larger bits of the same value out of the M bits have the one of logic values. Consequently, an effect such that a jitter which occurs in a transmission signal due to simultaneous switching noise can be lessened is obtained.

(4) In addition, on the reception side, transition in the reception signal is detected, a timing signal is generated, and the M-bit reception data in the reception signal is detected by the timing signal. Therefore, an effect is produced such that the transmission signal sent in the form of signal transition can be converted to a reception signal of a binary level with a simple configuration.

(5) In addition, by over-sampling the reception signal synchronously with a timing signal having a frequency which is a plurality of times as high as the transmission clock and receiving a plurality of sets of reception data on the reception side, and detecting one accurate reception data from the reception data on the reception side, an effect such that very-reliable reception data can be obtained without being influenced by a jitter and a skew included in the reception signal is produced.

(6) In addition, by converting a plurality of pieces of transmission data to parallel data and encoding each of the plurality of pieces of transmission data to transmission data of the M bits on the transmission side, generating the transmission signal as serial data and transmitting the transmission signal synchronously with a transmission clock of a cycle corresponding to time shorter than time required for encoding on the transmission side, recognizing transition in a reception signal of the M bits received via the transmission line and detecting the reception data of the M bits synchronized with the transmission clock on the reception side, converting the detected serial data into a plurality of pieces of parallel data and decoding the parallel data to the N-bit data on the reception side, an effect such that higher-speed data communication can be realized is obtained.

(7) In addition, the transmission signal includes the N-bit data and a control signal used for data communication, and transition takes place in signals of the same number which is two or larger in the N-bit data including the control signal. Therefore, an effect such that data communication can be performed easily at high speed while substantially reducing the number of signals is obtained.

(8) In addition, the control signal includes a signal indicative of absence of data to be transmitted. Consequently, an effect such that very flexible data communication in which a function of masking transmission data is provided, a dummy cycle is inserted to adjust a timing, or the like can be realized is produced.

(9) By providing a data communication device including: a transmission-side device including an encoder for encoding data of N bits (N being 2 or larger) to transmission data of M bits (M being 3 or larger), and a transmission circuit for outputting a transmission signal in which transition takes place in at least one level of any of the transmission data synchronously with a transmission clock; a transmission line to which the transmission signal of the transmission circuit is transmitted; and a reception-side device including a reception circuit for recognizing transition in a reception signal of the M bits received via the transmission line and detecting the reception data of the M bits on the basis of the transmission clock and a decoder for decoding the reception data to the N-bit data, effects are produced such that it becomes unnecessary to set a time margin for a jitter in a clock and a skew of data, and the data communication device capable of expanding the timing margin or increasing data transfer speed can be realized.

(10) In addition, the transmission-side device includes a signal processing circuit for generating the N-bit data, and the reception-side device includes a signal processing circuit for processing the N-bit data. With the configuration, an effect such that a data processing system having a high-speed data communication function can be realized is produced.

(11) In addition, by forming the transmission-side device on a single semiconductor chip, an effect such that high-speed data communication and miniaturization of the system can be achieved is obtained.

(12) In addition, by forming the reception-side device on a single semiconductor chip, an effect such that high-speed data communication and miniaturization of the system can be achieved is obtained.

(13) In addition, the signal processing circuit of the transmission-side device is formed on a first semiconductor ship, the encoder and the transmission circuit are formed on a second semiconductor chip, and the first and second semiconductor chips are integrally sealed to form an apparently single semiconductor integrated circuit device, the signal processing circuit of the reception-side device is formed on a third semiconductor chip, the reception circuit and the decoder are formed on a fourth semiconductor chip, and the third and fourth semiconductor chips are integrally sealed to form an apparently single semiconductor integrated circuit device. With the configuration, an effect such that the system realizing high performance and miniaturization while using the existing semiconductor chips can be realized is obtained.

(14) In addition, the transmission-side device is constructed by a single semiconductor integrated circuit device, the reception-side device is constructed by a single semiconductor integrated circuit device, and the transmission line is wiring means formed on a mounting board on which the semiconductor integrated circuit devices constructing the transmission-side device and the reception-side device are mounted. With the configuration, an effect such that the system realizing high performance and miniaturization can be realized is obtained.

(15) In addition, the encoder generates transmission data in which at least one bit out of M bits has one of binary logic values, and the transmission circuit generates a transmission signal which shifts the level of the data having the one of logic values out of the M-bit transmission data synchronously with a transmission clock and which makes the data having the other logic value maintained at the same level. Consequently, an effect such that the transmission signal having level transition in correspondence with transmission data can be generated synchronously with a transmission clock with a simple configuration is produced.

(16) In addition, the encoder generates transmission data in which bits of the same number which is two or larger out of the M bits have the one of logic values, thereby producing an effect such that a jitter in a transmission signal which is caused by simultaneous switching noise can be lessened.

(17) In addition, the reception circuit detects the transition in the reception signal, generates a timing signal, and detects reception data of M bits by the timing signal. Consequently, an effect such that a transmission signal transmitted in the form of signal transition can be converted to a binary-level reception signal with a simple configuration is produced.

(18) In addition, the reception circuit over-samples a reception signal by a timing signal having a frequency a plurality of times as high as that of the transmission clock, receives plural sets of reception data, and detects one accurate reception data from the reception data, thereby producing an effect that very reliable reception data can be obtained without being influenced by a jitter or a skew included in the reception signal.

(19) In addition, the transmission circuit converts the plurality of pieces of transmission data to parallel transmission data and encodes the parallel transmission data to the M-bit transmission data, the transmission circuit converts the transmission data to serial data, generates the transmission signal, and transmits the transmission signal to a transmission line synchronously with a transmission clock of a cycle corresponding to time shorter than time required for encoding, the reception circuit recognizes transition in a reception signal of the M bits received via the transmission line and detects the M-bit reception data synchronized with the transmission clock, and the decoder converts the detected serial data to a plurality of pieces of parallel data, and decodes the parallel data to the N-bit data. Thus, an effect such that a higher-speed data communication device can be realized is obtained.

(20) In addition, the encoder generates transmission data of M bits including the N-bit data and a control signal used for data communication, and the transmission circuit generates transmission signals in which transition occurs in signals of the same number which is two or larger including the control signal. With the configuration, an effect such that a high-speed easy-to-operate data communication device can be obtained while substantially reducing the number of signals is obtained.

(21) In addition, by including a signal indicative of absence of data to be transmitted in the control signal, an effect such that a very flexible data communication device in which a function of masking transmission data, a dummy cycle is inserted to adjust a timing, or the like can be obtained is produced.

(22) In addition, by using first MOSFETs connected in parallel for receiving a reception signal of M bits and each having an equivalent conductance characteristic and second MOSFETs of M pieces connected in parallel, in which (M-1) MOSFETs have conductance equivalent to that of the first MOSFETs, and one MOSFET has a conductance which is the half of the conductance, supplying a voltage corresponding to one of levels of the reception signal to gates of MOSFETs of the number corresponding to the number of bits having the one of logic values, which include the MOSFET having the half conductance, supplying a voltage corresponding to the other level of the reception signal to the gates of the remaining MOSFETs, and detecting a difference between a current flowing in the first MOSFETs and a current flowing in the second MOSFETs, an effect such that validity/invalidity of the reception signal can be detected at high speed is produced.

Although the inventions achieved by the inventor herein have been described concretely on the basis of the embodiments, obviously, the invention is not limited to the foregoing embodiments can be variously modified without departing from the gist. For example, a circuit for performing encoding so that transition takes place in at least one of levels of transmission data synchronously with a transmission clock and a circuit for generating a transmission circuit in a form of level transition from the encoded transmission data can be variously modified. The concrete configuration of a circuit for receiving the signal in the form of level transition generated as described above can be also variously modified. The present invention can be widely used for a data communication method and a data communication device for transmitting data consisting of a plurality of bits in parallel.

Effects obtained by the representative one of the inventions disclosed in the specification will be briefly described as follows. By encoding data of N bits (N being 2 or larger) to transmission data of M bits (M being 3 or larger) on a transmission side, generating a transmission signal in which transition takes place in at least one level of any of the transmission data synchronously with a transmission clock and transmitting the transmission signal to a transmission line on the transmission side, recognizing transition in the signal of the M bits received via the transmission line and detecting the reception data of the M bits synchronized with the transmission clock on a reception side, and decoding the M-bit reception data to the original N-bit data on the reception side, it becomes unnecessary to set a time margin for a jitter in a clock and a skew of data, so that expansion of the timing margin or increase in data transfer speed can be realized.

Consequently, transition in a transmission line always takes place in each data, so that it is unnecessary to transmit a clock or a data strobe signal in addition to data. Since the clock or data strobe signal is not used, the timing margin for a skew between a clock and data and a jitter is narrowed. By applying the invention, the timing margin is widened. Thus, higher-speed data transfer can be achieved, in addition to data, a signal having no data and a command can be transmitted, and signal pads and transmission lines of the amount can be reduced.

What is claimed is:

1. An apparatus comprising a semiconductor device, the semiconductor device including:
   a first circuit which converts a first signal of N bits (N being 2 or larger) into a second signal of M bits (M being 3 or larger); and
   a second circuit which receives said second signal and outputs a third signal of said M bits,
   wherein M is larger than N,
   wherein said third signal is a signal in which transition takes place in at least one level of a predetermined number of signals out of said third signals synchronously with a clock signal, said first and second circuits are formed on a first semiconductor chip,
   wherein said third signal is output to the outside of said first semiconductor chip,
   wherein said first circuit generates said second signal in which at least one bit out of M bits has a first binary logic value,
   wherein said second circuit generates said third signal which shifts the level of said second signals having said first binary logic value out of said M-bit second signals synchronously with said clock signal and which maintains said second signals having a second binary logic value at the same level, and
   wherein said second circuit generates said third signal in which the number of bits having said first logic value is two or more, and
   the apparatus further comprises a second semiconductor device formed on a second semiconductor chip, said second semiconductor device including:
   a plurality of first MOSFETs connected in parallel which receive said third signal of M bits, and each said first MOSFET having a conductance characteristic substantially equal to a first value;
   a plurality of second MOSFETs connected in parallel, the number of second MOSFETs being M, M-1 of said second MOSFETs each having a conductance characteristic substantially equal to said first value, and a remaining second MOSFET has a conductance characteristic which is substantially equal to one half the first value; and
   a circuit which detects a difference between a first current flowing in said first MOSFETs and a second current flowing in said second MOSFETs and generates a detection signal indicative of validity/invalidity of the third signal,
   wherein a voltage corresponding to one of two levels of said third signal is supplied to gates of said first MOSFETs which correspond to the number of bits having said first binary logic value, and to the remaining second MOSFET, and
   wherein a voltage corresponding to the other level of the third signal is supplied to the gates of any remaining first MOSFETs.

2. An apparatus comprising a semiconductor device, the semiconductor device including:
   a first circuit which converts a first signal of N bits (N being 2 or larger) into a second signal of M bits (M being 3 or larger); and
   a second circuit which receives said second signal and outputs a third signal of said M bits,
   wherein M is larger than N,
   wherein said third signal is a signal in which transition takes place in at least one level of a predetermined number of signals out of said third signals synchronously with a clock signal, said first and second circuits are formed on a first semiconductor chip,
   wherein said third signal is output to the outside of said first semiconductor chip,
   wherein said N bits are parallel bits,
   wherein said M bits are parallel bits, wherein said first circuit generates said second signal in which at least one bit out of M bits has a first binary logic value, wherein said second circuit generates said third signal which shifts the level of said second signals having said first binary logic value out of said M-bit second signals synchronously with said clock signal and which maintains said second signals having a second binary logic value at the same level, and wherein said second circuit generates said third signal in which the number of bits having said first logic value is two or more, and the apparatus further comprises a second semiconductor device formed on a second semiconductor chip, said second semiconductor device including:

a plurality of first MOSFETs connected in parallel which receive said third signal of M bits, and each said first MOSFET having a conductance characteristic substantially equal to a first value;

a plurality of second MOSFETs connected in parallel, the number of second MOSFETs being M, M-1 of said second MOSFETs each having a conductance characteristic substantially equal to said first value, and a remaining second MOSFET has a conductance characteristic which is substantially equal to one half the first value; and a circuit which detects a difference between a first current flowing in said first MOSFETs and a second current flowing in said second MOSFETs and generates a detection signal indicative of validity/invalidity of the third signal, wherein a voltage corresponding to one of two levels of said third signal is supplied to gates of said first MOSFETs which correspond to the number of bits having said first binary logic value, and to the remaining second MOSFET, and wherein a voltage corresponding to the other level of the third signal is supplied to the gates of any remaining first MOSFETs.

* * * * *